(12) United States Patent
Marschner et al.

(10) Patent No.: US 10,545,978 B1
(45) Date of Patent: Jan. 28, 2020

(54) TRANSFORMING DATASETS WITH NESTED DATA STRUCTURES

(71) Applicant: Trifacta Inc., San Francisco, CA (US)

(72) Inventors: Edward Eli Marschner, San Francisco, CA (US); Sean Philip Kandel, San Francisco, CA (US); Chris Beavers, San Francisco, CA (US); Adam Silberstein, Sunnyvale, CA (US); Alon Bartur, San Francisco, CA (US)

(73) Assignee: Trifacta Inc., San Francisco, CA (US)

( * ) Notice: Subject to any disclaimer, the term of this patent is extended or adjusted under 35 U.S.C. 154(b) by 701 days.

(21) Appl. No.: 15/195,059

(22) Filed: Jun. 28, 2016

Related U.S. Application Data

(60) Provisional application No. 62/186,028, filed on Jun. 29, 2015.

(51) Int. Cl.
*G06F 16/25* (2019.01)

(52) U.S. Cl.
CPC .......... *G06F 16/254* (2019.01); *G06F 16/252* (2019.01)

(58) Field of Classification Search
USPC ........................................................ 707/602
See application file for complete search history.

(56) References Cited

U.S. PATENT DOCUMENTS

| | | | | |
|---|---|---|---|---|
| 2004/0243593 A1* | 12/2004 | Stolte | .................... | G06F 17/246 |
| 2006/0031187 A1* | 2/2006 | Pyrce | .................. | G06F 3/04815 |
| 2012/0089562 A1* | 4/2012 | Deremigio | ............ | G06F 16/254 |
| | | | | 707/602 |
| 2013/0124466 A1* | 5/2013 | Naidu | ...................... | G06F 8/453 |
| | | | | 707/610 |
| 2014/0279834 A1* | 9/2014 | Tsirogiannis | ......... | G06F 16/211 |
| | | | | 707/602 |
| 2015/0356094 A1* | 12/2015 | Gorelik | ................... | G06F 16/16 |
| | | | | 707/748 |
| 2017/0147551 A1* | 5/2017 | Kalisz | ................... | G06F 17/245 |

OTHER PUBLICATIONS

Johnson, Brian, and Ben Shneiderman. "Tree-maps: A space-filling approach to the visualization of hierarchical information structures." Visualization, 1991. Visualization'91, Proceedings., IEEE Conference on. IEEE, 1991. (Year: 1991).*
Derthick, Mark, John Kolojejchick, and Steven F. Roth. "An Interactive Visualization Environment for Data Exploration." KDD. 1997. (Year: 1997).*

(Continued)

*Primary Examiner* — Mohsen Almani
(74) *Attorney, Agent, or Firm* — Fenwick & West LLP

(57) ABSTRACT

A data preprocessing system builds transformation scripts for preprocessing datasets for processing by a data analysis system. The data preprocessing system presents various representations of data of a dataset including visual representations, textual representations, or structural representations. The data preprocessing system receives selections of attributes or values based on these representations. The data preprocessing system generates recommendations of transformations based on the attributes or values selected. The data preprocessing system builds a transformation script based on the recommendations of the transformations. The transformation script can be used for preprocessing the dataset for analysis by a data analysis system.

20 Claims, 22 Drawing Sheets

(56) References Cited

OTHER PUBLICATIONS

Dimou, Anastasia, et al. "Mapping hierarchical sources into RDF using the RML mapping language." 2014 IEEE International Conference on Semantic Computing. IEEE, 2014. (Year: 2014).*
Fan, Wenfei, Floris Geerts, and Xibei Jia. "Sennandaq: a data quality system based on conditional functional dependencies." Proceedings of the VLDB Endowment 1.2 (2008): 1460-1463. (Year: 2008).*
Knoblock CA, Szekely P. Exploiting Semantics for Big Data Integration. AI Magazine. Mar. 1, 2015;36(1). (Year: 2015).*
Knoblock, Craig A., et al. "Semi-automatically mapping structured sources into the semantic web." Extended Semantic Web Conference. Springer, Berlin, Heidelberg, 2012. (Year: 2012).*
Knoblock, Craig A., and Pedro Szekely. "Semantics for big data integration and analysis." 2013 AAAI Fall Symposium Series. 2013. (Year: 2013).*
Li, Shih-Gong, "Graphical user interface-based method and apparatus for manifulating database structures"; Date of filing: Nov. 11, 1994 (Year: 1994).*
Weaver, Chris. "Patterns of coordination in Improvise visualizations." Visualization and Data Analysis 2007. vol. 6495. International Society for Optics and Photonics, 2007. (Year: 2007).*
Kandel, Sean, et al. "Wrangler: Interactive visual specification of data transformation scripts." Proceedings of the SIGCHI Conference on Human Factors in Computing Systems. ACM, 2011. (Year: 2011).*
Wikipedia: OpenRefine, Wikipedia.org, Last Edited Jul. 13, 2018, 4 pages, [Online] [Retreived on Aug. 16, 2018] Retrieved from the Internet<URL:https://en.wikipedia.org/wiki/OpenRefine>.
Google News Initiative, Introduction to OpenRefine, undated, 1 page, [Online] [Retrieved on Aug. 16, 2018] Retrieved from the Internet<URL:http://openrefine.org/>.
Kandel, S. et al., "Wrangler: Interactive Visual Specification of Data Transformation Scripts," CHI 2011, ACM, May 7-12, 2011, 10 pages.
Kandel, S. et al., "Profiler: Integrated Statistical Analysis and Visualization for Data Quality Assessment," AVI '12, ACM, May 21-25, 2012, 8 pages.
Liu, Z. et al., "*imMens*: Real-Time Visual Querying of Big Data," Eurographics Conference on Visualization (EuroVis) 2013, 2013, 10 pages, vol. 32, No. 3.
Weaver, C., "Patterns of Coordination in Improvise Visualizations," The GeoVISTA Center and Department of Geography, The Pennsylvania State University, udated, 12 pages.

* cited by examiner

1510a — Split on: 'Tuesday'

| column1_hours | ABC |
|---|---|
| {"Monday": {"close": "18:00", "open": "11:00"}, "Tuesday": {"close": "18:00", "open": "11:00"} | {"Monday": {"close |
| {} | {} |
| {"Monday": {"close": "21:00", "open": "10:00"}, "Tuesday": {"close": "21:00", "open": "10:00"} | {"Monday": {"close |
| Affect 1 column, 299 rows | Creates 2 columns |

1510b — Countpattern on: 'Tuesday'

| column1_hours | countpattern_colur |
|---|---|
| {"Monday": {"close": "18:00", "open": "11:00"}, "Tuesday": {"close": "18:00", "open": "11:00"} | 1 |
| {} | 0 |
| {"Monday": {"close": "21:00", "open": "10:00"}, "Tuesday": {"close": "21:00", "open": "10:00"} | 1 |
| Affect 1 column, 299 rows | Creates 1 column |

1510c — Extractlist on: 'Tuesday'

| column1_hours | extractlist_column1_hours |
|---|---|
| {"Monday": {"close": "18:00", "open": "11:00"}, "Tuesda | ["Tuesday"] |
| {} | [] |
| {"Monday": {"close": "21:00", "open": "10:00"}, "Tuesda | ["Tuesday"] |
| Affect 1 column, 0 rows | Creates 1 column |

1510d — Replace on: 'Tuesday'

| |
|---|
| {"Monday": {"close": "18:00", "open": "11:00"}, "Tuesday": {"close": "18:00", "open": "11:00"} |
| {} |
| {"Monday": {"close": "21:00", "open": "10:00"}, "Tuesday": {"close": "21:00", "open": "10:00"} |
| Changes 1 column |

1510e — Delete

| |
|---|
| {"Monday": {"close": "18:00", "open": "11:00"}, "Tuesday": {"close": "18:00", "open": "11:00"}, "Friday": {"clo |
| {"Monday": {"close": "21:00", "open": "10:00"}, "Tuesday": {"close": "21:00", "open": "10:00"}, "Friday": {"clo |
| {"Monday": {"close": "19:00", "open": "06:00"}, "Tuesday": {"close": "19:00", "open": "06:00"}, "Friday": {"clo |
| Affects all columns, 299 rows |

| | 2070b | 2070c | 2070d | |
|---|---|---|---|---|
| | | | | Transform |
| | "2009-01-20" | | | |
| | "2009-01-21" | "H R 384" | "On Passage" | |
| | "2009-01-21" | "H R 384" | "On Motion to Recommit wi..." | |
| | "2009-01-21" | "H R 384" | "Table Appeal of the Ruli..." | |
| | "2009-01-21" | "H R 384" | "On Agreeing to the Amend..." | |
| | "2009-01-22" | "H RES 58" | "On Motion to Suspend the..." | |
| | "2009-01-22" | "H RES 56" | "On Motion to Suspend the..." | |
| | "2009-01-23" | "H J RES 3" | "On Passage" | |
| | "2009-01-24" | | | |
| | "2009-01-25" | | | |
| | "2009-01-26" | "H J RES 84" | "On Motion to Suspend the..." | |
| | "2009-01-26" | "H J RES 31" | "On Motion to Suspend the..." | |
| | "2009-01-27" | "H R 1" | "On Question of Considera..." | |
| | "2009-01-27" | "S 181" | "On Passage" | |
| | "2009-01-27" | "S 181" | "On Motion to Commit" | |
| | "2009-01-27" | "H J RES 88" | "On Agreeing to the Resol..." | |
| | "2009-01-27" | "H J RES 88" | "On Ordering the Previous..." | |
| | "2009-01-27" | "H J RES 87" | "On Agreeing to the Resol..." | |
| | "2009-01-27" | "H J RES 87" | "On Ordering the Previous..." | |
| | "2009-01-28" | "H R 1" | "On Passage" | |
| | "2009-01-28" | "H R 1" | "On Motion to Recommit wi..." | |
| | "2009-01-28" | "H R 1" | "On Agreeing to the Amend..." | |
| | "2009-01-28" | "H R 1" | "On Agreeing to the Amend..." | |
| | "2009-01-28" | "S 328" | "On Motion to Suspend the..." | |
| | "2009-01-28" | "H RES 92" | "On Agreeing to the Resol..." | |
| | "2009-01-28" | "H RES 92" | "On Question of Considera..." | |
| | "2009-01-29" | | | |
| | "2009-01-30" | | | |

2070a

2010 —
```
{
  "status": "OK",
  "copyright": "Copyright (c) 2014 The New York Times Company. All Rights Reserved.",
  "results": {
```
2030 —
```
    "chamber": "House",
    "start_date": 2009-01-20,
    "end_date": 2009-01-20,
    "num_results": 0,
    "votes": []
  }
},
{
  "status": "OK",
  "copyright": "Copyright (c) 2014 The New York Times Company. All Rights Reserved.",
  "results": {
```
2040 —
```
    "chamber": "House",
    "start_date": 2009-01-21,
    "end_date": 2009-01-21,
    "num_results": 4,
    "votes": [
      {
        "congress": 111,
        "session": 1,
        "roll_call": 26,
        "vote_uri": "http://api.nytimes.com/svc/politics/v3/us/legis
```
2050 —
2060 —
```
        "bill_number": "H R 384",
        "question": "On Passage",
        "description": "TARP Reform and Accountability Act",
        "vote_type": "RECORDED VOTE",
        "date": 2009-01-21,
        "time": 16:44:00,
        "result": "Passed",
```
2020 —
```
        "democratic": {
          "yes": 242,
          "no": 10,
          "present": 0,
          "not_voting": 4,
          "majority_position": "Yes"
        },
```

| | | |
|---|---|---|
| | | Transform |

| | 2200b | 2200c | 2200d |
|---|---|---|---|
| "On Passage" | "Yes" | "No" |
| "On Motion to Recommit wi..." | "No" | "Yes" |
| "Table Appeal of the Rul..." | "Yes" | "No" |
| "On Agreeing to the Amend..." | "Yes" | "Yes" |
| "On Motion to Suspend the..." | "Yes" | "Yes" |
| "On Motion to Suspend the..." | "Yes" | "Yes" |
| "On Passage" | "No" | "Yes" |
| | | |
| "On Motion to Suspend the..." | "Yes" | "Yes" |
| "On Motion to Suspend the..." | "Yes" | "No" |
| "On Question of Considera..." | "Yes" | "No" |
| "On Passage" | "Yes" | "No" |
| "On Motion to Commit" | "No" | "Yes" |
| "On Ordering the Previous..." | "Yes" | "No" |
| "On Agreeing to the Resol..." | "Yes" | "No" |
| "On Ordering the Previous..." | "Yes" | "No" |
| "On Agreeing to the Resol..." | "Yes" | "Yes" |
| "On Passage" | "Yes" | "Yes" |
| "On Motion to Recommit wi..." | "No" | "No" |
| "On Agreeing to the Amend..." | "No" | "No" |
| "On Agreeing to the Amend..." | "No" | "No" |
| "On Motion to Suspend the..." | "Yes" | "Yes" |
| "On Agreeing to the Resol..." | "Yes" | "No" |
| "On Question of Considera..." | "Yes" | "No" |

2200a

```
.results.votes[].republican
  "start_date": 2009-01-21,
  "end_date": 2009-01-21,
  "num_results": 4,
  "votes": [
    {
2010
      "congress": 111,
      "session": 1,
      "roll_call": 26,
      "vote_uri": "http://api.mytimes.com/svc/politics/v3/us/legis
      "bill_number": "H R 384",
2020
      "question": "On Passage",
      "description": "TARP Reform and Accountability Act",
      "vote_type": "RECORDED VOTE",
      "date": 2009-01-21,
      "time": 16:44:00,
      "result": "Passed",
      "democratic": {
        "yes": 242,
        "no": 10,
        "present": 0,
        "not_voting": 4,
        "majority_position": "Yes"
      },
2030
      "republican": {
        "yes": 18,
        "no": 156,
        "present": 0,
        "not_voting": 4,
        "majority_position": "No"
      },
      "independent": {
        "yes": 0,
        "no": 0,
        "present": 0,
        "not_voting": 0,
      },
      "total": {
        "yes": 260,
        "no": 166,
        "present": 0,
        "not_voting": 7,
      }
    },
```

TRANSFORMING DATASETS WITH NESTED DATA STRUCTURES

CROSS REFERENCE TO RELATED APPLICATION

This application claims the benefit of U.S. Provisional Application No. 62/186,028, filed on Jun. 29, 2015, which is incorporated by reference in its entirety.

BACKGROUND

The disclosure relates in general to preprocessing data for analysis by big data analysis systems, for example, parallel and distributed systems and more specifically to determining transformations for preprocessing datasets with nested data structures.

Organizations generate large amount of data having different sources, for example, data generated by systems within the organization, data generated by interactions with external systems, data generated by sensors, manual entry of data, and so on. This data may include structured data as well as unstructured and/or semi-structured data that is stored in a wide variety of formats. Organizations perform data mining operations on this data to extract various types of information, for example, information indicating health of various parts of the organization, information predicting performance of various projects within the organization, information describing allocation of resources within the organization and so on. Big data analysis systems are being developed to process the huge amount of data being generated by organizations. These big data analysis systems typically use parallel and distributed systems to process the data. Big data analysis systems typically need the data to be available in a specific format to be able to analyze that data and exploit the parallelism inherent in the data.

However the quality of raw data that is generated by various systems within the organization is often not in a format that can be readily processed by big data systems. This is so because the raw data often contains missing fields, data anomalies, erroneous values, duplicate values, nested structures that cannot be processed by the big data analysis system, data that does not conform to certain type constraints, and so on. The amount of data that is in a format in which it can be processed by big data systems is typically a small fraction of the overall data available. The quality of results obtained by analyzing the data is therefore limited by the amount of data that the big data system can process. The amount of data that can be processed by the big data systems can be improved by preprocessing the raw data by transforming the data to a form that can be efficiently processed by the big data systems. Preprocessing of data requires performing transformations to the data to bring the data to a desired form. Automatic transformation of data requires generation of scripts for performing the transformations.

Datasets often include nested structures having arbitrary sizes and arbitrary levels of nesting of data. Generating transformations for such datasets is often difficult since a user has to understand the structure of a complex dataset to be able to specify transformations for them. These datasets may be obtained from sources that either do not provide documentation of the structure or provide inaccurate or outdated documentation. Trying to develop transformations for such datasets without having proper documentation describing the structure of the datasets can be a tedious and error prone task. Conventional techniques for developing transformation scripts are inadequate in handling nested data structures in datasets.

SUMMARY

A data preprocessing system builds a transformation script for preprocessing datasets for analysis by data analysis systems. The preprocessing step allows datasets to modified to a form that can be readily processed by a data analysis system. As a result, the preprocessing step increases the amount of data of the dataset that a data analysis system can process. More specifically, the transformation script extracts (or unnests) data of nested data structures stored as columns of the dataset.

In an embodiment, the data preprocessing system samples the dataset to obtain a sample dataset. The data preprocessing system configures for display, attributes of the sample dataset. The data preprocessing system presents a visual representation comprising geometric shapes representing statistical information describing attributes of the dataset. An example of a visual representation is a chart, for example, a histogram. A nested data structure is represented as a composite attribute in the dataset. A composite attribute includes other attributes that may themselves be composite attributes. The data preprocessing system shows a visual representation that presents statistical information describing the attributes of the composite attribute.

The data preprocessing system builds the transformation script iteratively. For each iteration, the data preprocessing system performs the following steps. The data preprocessing system receives a selection of one or more attributes of a composite attribute. The selection is performed by identification of geometric shapes corresponding to he attributes of the composite attribute. The data preprocessing system determines recommendations of transformations for extracting the values of the selected attributes as new columns of the dataset. The data preprocessing system adds one or more recommendation transformations to the transformation script. These steps can be used to unnest deeply nested data structures level by level. In an embodiment, once the transformation script is built, the entire input dataset is preprocessed using the transformation script. The preprocessed input dataset is sent for analysis by the data analysis system.

In an embodiment, the data preprocessing system also presents a textual representation of the data of the dataset. The data preprocessing system may receive selection of attributes via the visual representation or via the textual representation. The data preprocessing system determines recommendations of transformations based on the mechanism used to select an attribute. Accordingly, the data preprocessing system determines a first set of recommended transformations if the selection of an attribute is performed using the visual representation and a second set of recommended transformations if the selection of an attribute is performed using the textual representation. For example, the recommended transformations for an attribute selected using the visual representation include the unnesting operation whereas the recommended transformations for an attribute selected using the visual representation further include text based operations such as replacing the text string, deleting the text string, and so on.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 shows a screenshot of a user interface showing a subset of data and statistical information describing the data, according to an embodiment.

FIG. 10 shows a screenshot of a user interface showing a dataset including a composite attribute, according to an embodiment.

FIG. 11 shows a screenshot of a user interface showing a composite attribute unnested into a plurality of columns of the dataset, according to an embodiment.

FIG. 13 shows a screenshot of a user interface illustrating recommendations of transformations based on a selection of attributes via a visual representation, according to an embodiment.

FIG. 14 shows a screenshot of a user interface illustrating recommendations of transformations based on a selection of attributes via a textual representation, according to an embodiment.

FIG. 15 shows a screenshots of user interfaces illustrating additional recommendations of transformations based on a selection of attributes via a textual representation, according to an embodiment.

FIG. 16 shows a screenshot of a user interface illustrating a structural representation of values of a composite attribute based on indentation of text, according to an embodiment.

FIG. 20 shows a screenshot of the user interface showing a structural representation of values of a column of a dataset storing a composite attribute, according to an embodiment.

FIG. 21 shows a screenshot of the user interface showing unnesting of a composite attribute representing an array or a set of values, according to an embodiment.

FIG. 22 shows a screenshot of the user interface showing unnesting of another composite attribute, according to an embodiment.

The steps of processes illustrated as flowcharts described herein can be executed in an order different from that described herein. Furthermore, actions described as being executed by certain software modules may be executed by other software modules than those indicated herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

System Environment for Big Data Analysis

Figure 1:
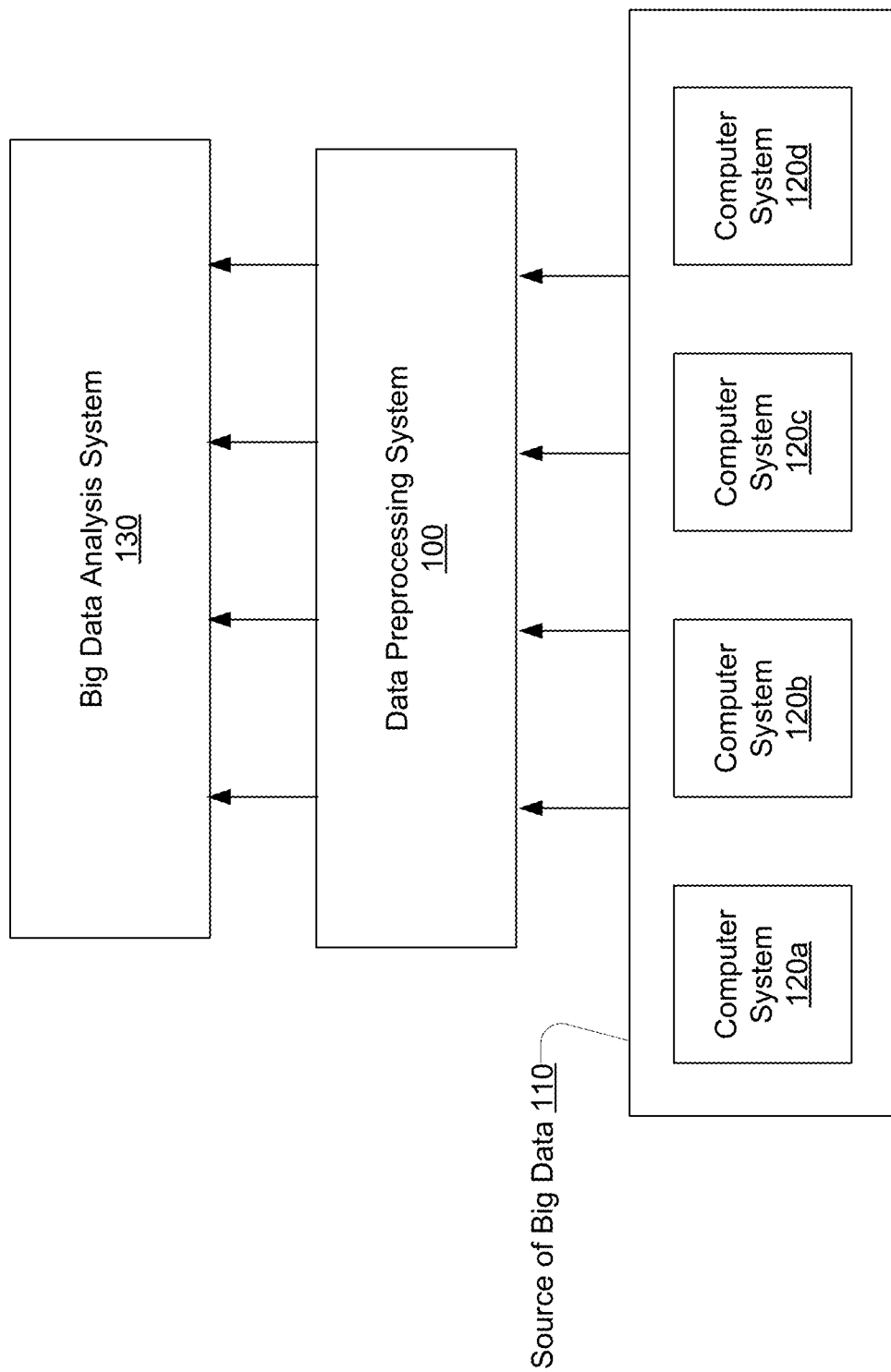
FIG. 1 shows the overall system environment for performing big data analysis, according to an embodiment.

FIG. 1 shows the overall system environment for performing big data analysis, according to an embodiment. FIG. 1 shows various systems involved in generation of and processing of big data. The overall system environment includes a source of data 110, a data preprocessing system 100, and a data analysis system 130. In other embodiments, more or less systems/components than those indicated in FIG. 1 may be used. For example, the various systems shown in FIG. 1 may interact via a network (not shown in FIG. 1). Furthermore, there may be more or less instances of each system shown in FIG. 1, for example, there may be multiple big data analysis systems 130. The big data analysis system is also referred to herein as a data analysis system, analysis system, or a system.

FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

The source of big data 110 may be an organization or enterprise that uses multiple computer systems 120 for processing data of the organization or enterprise. Each computer system 120 performs activities that result in generation of data. For example, a computer system 120 may perform transactions and generate logs based on the transactions. Another computer system (or systems) may process and generate data based social interactions by logging actions performed by users. Another computer system 120 may process, generate, and store images. The data available in the computer systems 120 is analyzed by the big data analysis system 130.

Since the amount of data generated by such sources of data can be large and unstructured, conventional analysis tools, for example, reporting systems based on database queries are often not capable of processing this data. As a result, big data analysis systems 130 are used that are often parallel and distributed systems and are capable of processing unstructured data. Big data analysis systems 130 typically analyze big data to perform data mining operations, predictive analysis, forecasting, text mining, and so on. For example, large amount of data representing sales, interactions between users, and so on may be used for derive sales trends among different types of consumers, to predict success of different sales campaigns, and so on.

The raw data produced by source of big data 110 includes several records that are not in a form in which the big data analysis system 130 can process. The big data analysis system 130 typically requires the input data to conform to certain formatting rules. The formatting rules may be specific to certain columns of a dataset or may apply to multiple columns. A formatting rule may specify various constrains applicable to a particular type of data.

The sources of big data 110 often produce data in formats that were not anticipated by the big data analysis system 130. Following is an example illustrating non-conformance of raw data with respect the formatting rules of a big data analysis system 130. The big data analysis system 130 may expect a particular field to be numeric whereas various data records obtained from the source of big data 110 may include alphabetic characters or even special characters. Similarly, the big data analysis system 130 may expect a field to store URLs (uniform resource locators) and not all values of the field produced by the source of big data 110 may include URLs in a proper format. As another example, the big data analysis system 130 may assume one or more different formats of addresses for an address field. Typically, big data analysis systems 130 are unable to process data represented as nested data structures. Often nested data structures are received without proper documentation describing the nested data structure. The documentation describing the nested data structure is either missing or outdated.

The data preprocessing system 100 performs processing of the raw data obtained from the sources of big data 110 to transform the raw data into a format that is suitable for consumption by the big data analysis system 130 (i.e., a format that conforms to the formatting rules of the big data analysis system 130.) For example, if the raw data includes URLs that do not conform to the standard URL format, the data preprocessing system 100 transforms the data to generate URL in a format that can be processed by the big data analysis systems 130. For example, assume that several URL fields include values of the form "http;//xyz.com" where the prefix "http" is followed by ";" instead of ":". This may happen, for example, if the URLs are obtained from logs based on URL values manually entered by users (that include commonly occurring typos.)

The step of preprocessing the data is also referred to as cleansing the data by removing data that does not satisfy criteria that determine whether the data can be processed by the big data analysis system 130. These criteria include various constraints that may be specified for the data, for example, properties of different types of data including format of the data, types of values that can be occupied by specific fields, and so on.

End users often make mistakes while entering URLs, thereby introducing incorrect URL values in the data. However, the data entered by the user is still valuable information since the system may be able to derive information based on the fact that the user intended to enter a specific URL. The intended URL may be obtained by performing a simple transformation of the incorrect URL field that replaces ";" by ":". The data preprocessing system 100 may include a large number of such transform operations that pre-process the raw data produced by sources of big data 110.

The transform operations may be provided by experts that review the data produced by the big data source 110. The data preprocessing system 100 may include transform operations based on commonly occurring patterns of bad data typically generated by sources of big data 110. Accordingly, the data preprocessing system 100 takes raw data generated by sources of big data 110 and prepares (or preprocesses) the data so as to transform the raw data for consumption by big data analysis system 130.

The data preprocessing system 100 may not be able to transform all available raw data to a format that conforms to the formatting rules of the big data analysis system. For example, certain fields may store values from which no meaningful information may be deciphered. However, even if the data preprocessing system 100 is able to preprocess a significant portion of raw data, the amount of information available to the big data analysis system 130 increases by certain amount.

As an example, assume that the big data analysis system is able to process 50% of the raw data generated by the source of big data without any preprocessing. The remaining 50% of the raw data is assumed to be bad raw data that does not conform to the formatting rules of the big data analysis system 100. Assume that the data preprocessing system 100 is able to transform 80% of the bad raw data to a form that can be processed by the big data analysis system 130 but is unable to decipher the remaining 20% of the bad raw data. In this situation, even though the data preprocessing system 100 is unable to decipher 20% of the bad raw data, the data preprocessing system 100 helped increase the amount of data that can be processed by the big data analysis system 130 to 90% of the original raw data. As a result, the big data analysis system 130 is likely to be able to generate more accurate information or derive new information based on the additional data that the big data analysis system 130 is able to process.

Figure 2:
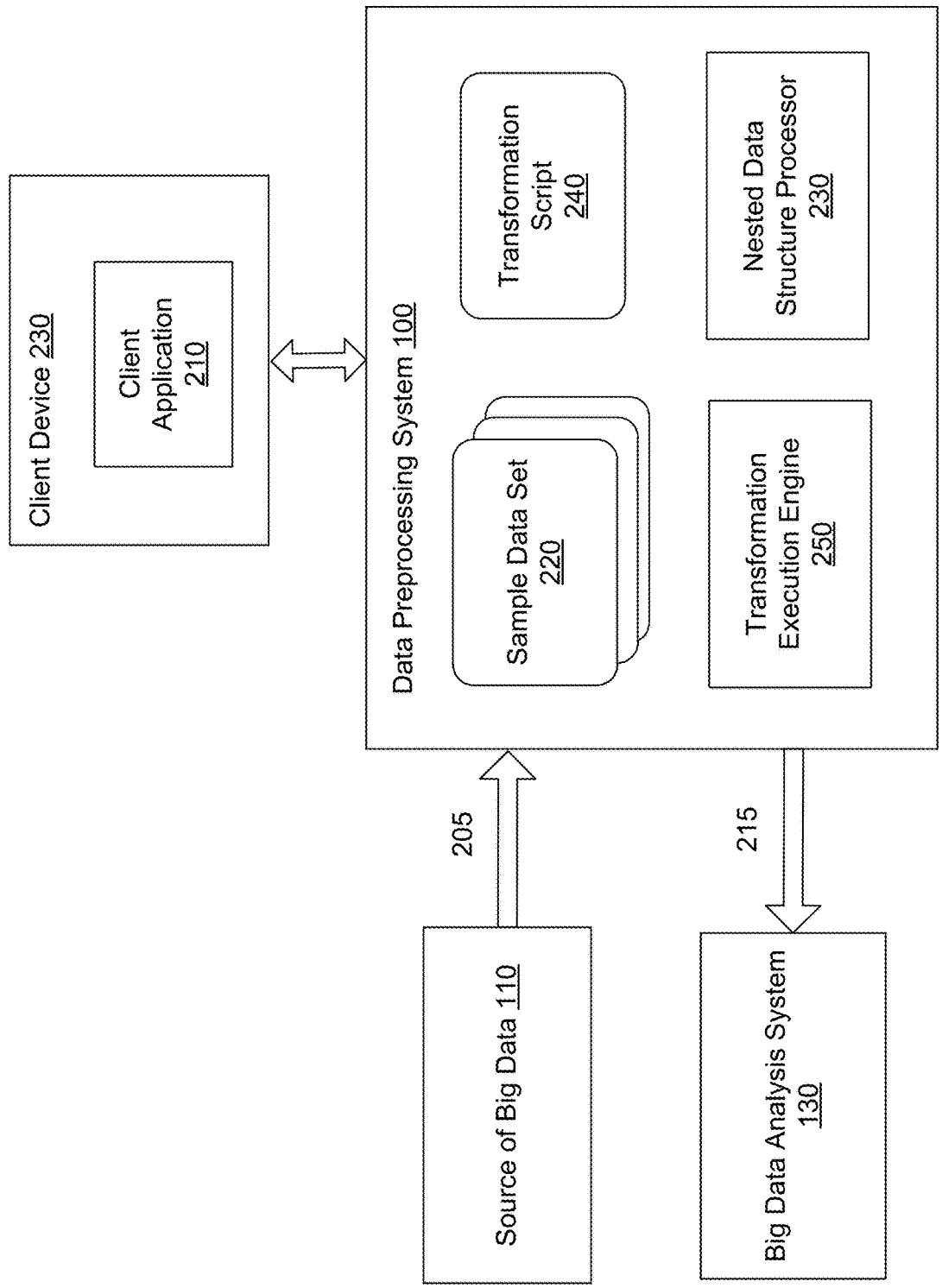
FIG. 2 shows the overall system environment illustrating details of data preprocessing system for preprocessing data for big data analysis, according to an embodiment.

FIG. 2 shows the overall system environment illustrating details of data preprocessing system for preprocessing data for big data analysis, according to an embodiment. Similar to FIG. 1, the data preprocessing system 100 receives 205 data from sources of big data 110, preprocesses the data to improve the amount of data that can be analyzed by the big data analysis system 130 and provides 215 the preprocessed data to the big data analysis system 130.

A user may interact with the data preprocessing system 100 via the client device 260. The client device 260 executes a client application 210 that allows a user to interact with the data preprocessing system 100, for example, to develop and/or test transformation scripts that are used for preprocessing of the data. A transformation script includes a set of transform operations (or a sequence of transform operations.) The client application 210 may be an internet browser that interacts with the data preprocessing system 100 via internet. Alternatively, the client application 210 may be a custom application that interacts with the data preprocessing system 100 using proprietary communication protocols.

In one embodiment, a computer system executing code for the data preprocessing system 100 or the client device 260 is a conventional computer system executing, for example, a Microsoft Windows-compatible operating system (OS), Apple OS X, and/or a Linux distribution. In another embodiment, the computer system can be a device having computer functionality, such as a personal digital assistant (PDA), mobile telephone, video game system, etc. The computer system includes a non-transitory storage medium storing instructions that perform the various steps described herein.

The various systems shown in FIG. 2 may interact via a network (not shown in the figure.) The network enables communications between the various systems. In one embodiment, the network uses standard communications technologies and/or protocols. Thus, the network can include links using technologies such as Ethernet, 802.11, worldwide interoperability for microwave access (Wi-MAX), 3G, digital subscriber line (DSL), asynchronous transfer mode (ATM), InfiniBand, PCI Express Advanced Switching, etc. Similarly, the networking protocols used on the network can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

The data preprocessing system 100 receives datasets for processing from the sources of big data 110. A dataset comprises one or more attributes. In an embodiment, the attributes of the dataset are represented as columns and the dataset is represented as a set of columns. A column comprises a set of cells, each cell storing a cell value. An attribute may be a simple attribute or a composite attribute.

A simple attribute is an attribute that can be represented using a single value, for example, an integer, a floating point value, a string value, or a timestamp. A composite attribute is an attribute that comprises other attributes. A composite attribute is also referred to herein as a nested attribute. For example, a name can be represented using a composite attribute that includes at least two attributes, a first name, and a last name. Similarly, an address may be represented by a composite attribute comprising various attributes including street name, street number, city, state, zip code, country and so on.

A composite attribute may be nested. In other words a composite attribute may comprise attributes one or more of which are also composite attributes. Accordingly, data preprocessing system 100 represents a composite attribute using a nested data structure. The nested data structure may be represented as an object that comprises other objects that are nested within the object.

The data preprocessing system 100 may represent a composite attribute using name-value pairs. Accordingly, each attribute of the composite attribute is represented using a name-value pair (or a key-value pair.) A composite attribute may be represented as a map from attribute names to attribute values. A value of a name-value pair corresponding to an attribute of the composite attribute itself may be a composite attribute and therefore comprise a plurality of name-value pairs.

The data obtained from the sources 110 of big data is typically too large to be viewed in a reasonable time by a user for purposes of preprocessing the data. In an embodiment, the data preprocessing system 100 receives requests from the user to generate sample datasets 220. The data preprocessing system 100 presents user interfaces to a user via the client application 210 to receive requests from the user for developing the transformation script 240. The requests for developing the transformation script include reviewing a sample dataset, executing a transformation command on the sample dataset, and determining whether to add the transformation command to the transformation script 240. More specifically, the requests include requests for extracting (or unnesting) an attribute within a composite attribute and storing the values of the extracted attribute as a new column of the dataset.

The transformation execution engine 250 executes one or more transformation commands or a transformation script against a sample dataset 220 or against the entire dataset received from a source of big data 110. In some embodiments, the execution of the transformation script on the entire dataset is performed by a system different from the data preprocessing system 100. The execution of the transformation script on the entire dataset may be performed as an offline (or batch process) that does not require interactions with users once the execution is started.

The process of developing the transformation script is an iterative process that may require several interactions between the data preprocessing system 100 and the user via the client application 210. Once the transformation script 240 is finalized, the data preprocessing system 100 executes the transformation script 240 against the entire dataset received from the source of big data 110. The result of the execution of the transformation script 240 against the entire dataset is presented to the big data analysis system 130. This provides the big data analysis system 130 with data that has a much larger percentage of data that conforms to the formatting rules of the big data analysis system compared to the raw data provided by the sources of big data 110.

System Architecture of the Data Preprocessing System

Figure 3:
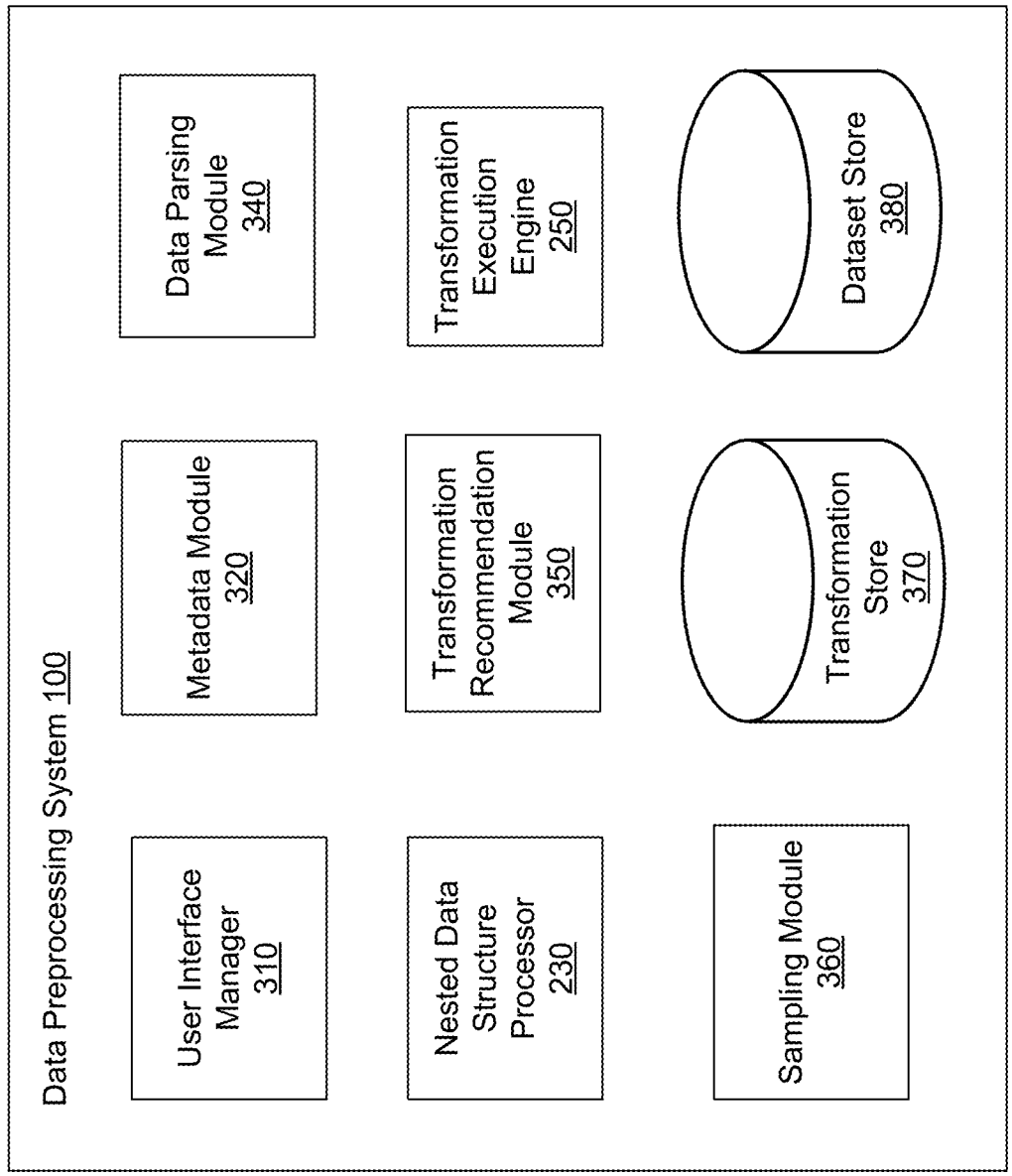
FIG. 3 shows the architecture of a data preprocessing system for preprocessing data for big data analysis, according to an embodiment.

FIG. 3 shows the architecture of a data preprocessing system for preprocessing data for big data analysis, according to an embodiment. The data preprocessing system 100 includes a user interface manager 310, a metadata module 320, a nested data structure processor 230, a transformation recommendation module 350, a transformation execution engine 250, a sample store 360, a transformation script store 370, and a dataset store 380. In other embodiments, the data preprocessing system 100 may include other modules not described herein. Functionality indicated as provided by a particular module may be implemented by other modules instead.

The user interface manager 310 configures and presents various user interfaces to a client device 260 allowing a user to interact with the data preprocessing system 100. The user interfaces configured by the user interface manager 310 allow the user to identify datasets, specify transformations to be performed on the datasets, present information describing the datasets and so on. Various example user interfaces are described herein and presented as screenshots in FIGS. 4-9.

In an embodiment, the user interface manager 310 configures a markup language document, for example, an HTML (hypertext markup language) document corresponding to a user interface. The user interface manager 310 sends the markup language document for presentation via an internet browser (that represents a client application 210) executing on a client device 260.

The dataset store 380 stores datasets and metadata describing the datasets. In an embodiment, the data preprocessing system 100 presents a user interface to a user allowing the user to specify a source of dataset. The user interface may be presented to the user via the client application 210. The data preprocessing system 100 receives data for the dataset from the source and stores the dataset in the dataset store 380. The source of the dataset can be a file stored locally on the system executing the data preprocessing system 100, on a client device 260 used to provide the information, or on an external system. The data preprocessing system 100 receives information identifying the dataset, for example, a file address, a URL, or information identifying a data stream.

The metadata module 320 determines metadata describing the datasets received by the data preprocessing system 100. In an embodiment, the metadata module 320 takes a sample of rows and identifies row separators and column separators. By analyzing the various data values corresponding to columns, the metadata module 320 infers types of each column. In an embodiment, the metadata module 320 sends information describing the various column types to the user via the user interface manager 310. The user interface manager 310 presents the inferred metadata describing the various columns to the user via the client application 210. The client application 210 allows the user to modify the inferred column types, thereby reassigning one or more column types to a manually specified data types. The metadata module 320 receives the manually specified column types and updates the metadata stored in the dataset store 380 accordingly.

The transformation store 370 stores various types of transformations received from user via the client application 210. In an embodiment, the transformation store 370 stores transformations using a text format, for example, a syntax of a proprietary script, syntax of a standard programming language, or using markup languages such as XML (extensible markup language).

The data parsing module 340 parses data received by the data preprocessing system 100 to determine various parts of the data. The data parsing module 340 identifies record separators, for example, based on newline characters to determine where one record of the dataset ends and the next record begins.

The transformation recommendation module 350 presents users with various transformations that can be used for processing data of a dataset. Examples of recommendations of transformations are shown in various figures, for example, recommendation 520 in FIG. 5, recommendations 730 in FIG. 7, and recommendations 830 in FIG. 8.

Figure 5:
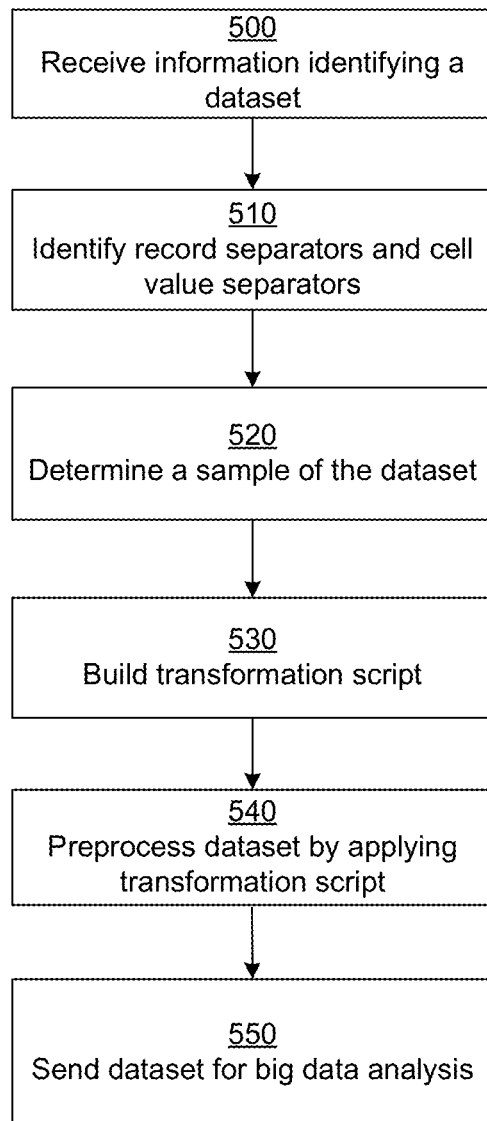
FIG. 5 shows the overall process for preprocessing data in preparation for analysis by a big data analysis system, according to an embodiment.

The transformation recommendation module 350 may generate recommendations in response to certain user actions, for example, a selection of a data element or a portion of data element by the user. For example, assume that the user interface manager 310 receives a user selection of a portion of a data value of a column specified using the client application 210. As shown in FIG. 5, a user selects the substring "???" in a data element 510. The user interface manager 310 provides information indicating the data value selected, the column of the data value, and so on. The transformation recommendation module 350 identifies various data transforms applicable to the user selection and sends them for display to the user via the user interface manager 310.

The transformation execution engine 250 receives transformations and executes the transformations for a given set of input datasets. In an embodiment, the transformation execution engine 250 receives transformation script and executes the transformation script for a given set of input datasets. A transformation script is a representation of a sequence (or set) of transformations.

The transformation execution engine 250 includes instructions to execute various operators associated with the transformations. Examples of operators (or transformations based on the operators) include replacing a substring with another string, replacing a character with another character or string, replacing a substring at a particular location by another string (the location determined by identifying a character/substring and indicating whether the substring to be replaced occurs before/after the identified character/substring), splitting a column based on a separator into multiple columns, extract a substring from an attribute, joining two or more datasets based on join keys, aggregating records, grouping records, determining aggregate values of a column for groups of records based on certain criteria, filtering records based on certain criteria such that only records satisfying the given criteria are output by the transform operation, extracting an attribute within a composite attribute as a new column of the dataset, and so on.

The sample store 360 stores samples of various datasets stored in the dataset store 380. The data preprocessing system 100 provides these samples for use in developing and testing transformation scripts. The data preprocessing system 100 uses sample sets for development and testing of transformation scripts because the entire dataset received for processing may be very large. As a result, development and testing of transformation scripts based on an entire dataset may be slow since execution of each transformation on the entire dataset may take a long time. Samples stored in the sample store 360 may be determined by the sampling module 360 or by the transformation based sampling modules 340. The transformation scripts may be used for preprocessing datasets received for data analysis using the datasets, for example, using big data analysis systems 130.

Datasets processed by the data preprocessing system may include nested data structures. The nested data structure processor 330 performs various operations on nested data structures received in datasets. The nested data structure processor 330 processes nested data structures specified using various formats, for example, JSON (JavaScript Object Notation), XML (extensible markup language), HTML (hypertext markup language), serialized objects, and so on. The nested data structure processor 330 is configured to read a plurality of instances of data structures and determine a generic representation of the nested data structure corresponding to the plurality of instances.

A nested data structure may include structures (e.g., composite attributes) embedded within another structure (e.g., another composite attribute.) In other words, the nested data structure has data values hierarchically organized. For example, a nested data structure may comprise a high level object including a plurality of attributes, wherein each attribute may be either a single value, a representation of a plurality of values (for example, an array or a set), or another nested data structure. Since a nested data structure recursively comprises other nested data structures, a nested data structure can be arbitrability deep.

The nested data structure processor 330 infers the organization of data of a nested data structure by analyzing individual instances of the nested data structure. For example, the nested data structure processor 330 may determine how nested data structures representing data of a column of a dataset are organized. Different instances of the nested data structure occurring in the column may have differences in the attributes contained within each instance. For example, certain attributes may be present in one instance but absent in another instance. The nested data structure processor 330 combines information from various instances to determine an overall structure (describing the set of attributes of the nested data structure) that is applicable to all instances analyzed. In an embodiment, the nested data structure processor 330 analyzes a sample of a dataset to determine the organization of the nested data structure. The accuracy with which the inferred organization matches the entire set of values depends on the quality of the sample, i.e., the accuracy with which the sample represents the overall dataset.

In an embodiment, the nested data structure processor 330 processes nested data structures including data specified as name-value pairs. For example, the hours of operation of businesses may be specified as name-value pairs, where a name is a string representing a day of the week and a value represents one or more ranges of time values. As an example, the hours of operation of a first restaurant may be {Monday:{9:00 am-5 pm}, Tuesday:{9:00 am-5 pm}, Wednesday:{9:00 am-5 pm}, Thursday:{9:00 am-5 pm}, Friday:{9:00 am-5 pm}, Saturday{9:00 am-1:00 pm} }. This example business does not have any values for key Sunday since the business is closed on Sundays. The hours of operation of another business may be {Tuesday:{9:00 am-5 pm }, Wednesday:{9:00 am-5 pm}, Thursday:{9:00 am-5 pm}, Friday:{9:00 am-5 pm}, Saturday{9:00 am-1:00 pm}, Sunday:{9:00 am-5 pm} }. This example business does not have any value for key Monday since it is closed on Monday. However it has values for key Sunday. The nested data structure processor 330 determines the overall nested data structure of the hours of operation by taking the union of keys of these two (or more) instances of the structure.

In general, a nested data structure may be represented using composite attributes that include other attributes that themselves may be composite attributes. Accordingly, a nested data structure may be multiple levels deep. Furthermore, a composite attribute may include multiple composite attributes within it. As an example, a composite attribute representing a business is {"business_id": "WVi866qlJg", "full_address": "1000 W Bell Rd, Phoenix, Ariz. 9999", "hours": {"Monday": {"close": "18:00", "open": "11:00"}, "Tuesday": {"close": "18:00", "open": "11:00"}, . . . }, "categories": ["Active Life", "Arts & Entertainment", "Stadiums & Arenas", "Horse Racing"], "city": "Phoenix". . . }. This composite attribute includes an "hours" attribute that is also composite. Furthermore, the hours attribute includes time ranges for each day. A time range is represented as a composite attribute comprising a "close" attribute and an "open" attribute. The time range is represented using name-value pairs. The composite attribute for the business also includes a "categories" attribute that is a set of values or an array. An array is represented using a set of values. Each position within the set of values may be associated with an index value for the array.

The nested data structure processor 330 may receive different instances of nested data structures with different name-value pairs. For example, assume that the nested data structure processor 330 receives a first instance of a nested data structure that includes a first set of name-value pairs and a second instance of the same nested data structure that includes a second set of name-value pairs. The nested data structure processor 330 determines that the nested data structure corresponding to these two instances includes a union of the two first set and the second set of name-value pairs. For example, if the nested structure represents a column of a dataset, various instances may include different subsets of the name-value pairs as determined by the nested data structure processor 330.

In an embodiment, the nested data structure processor 330 determines a listing of values as an array or a set. For example, a nested data structure may represent locations of a business. A first business may represent the locations as ["New York", "Los Angeles", "San Francisco"] and another business may represent the locations as ["San Francisco", "Chicago", "Atlanta", "Los Angeles"]. Accordingly, the representation of the structure includes an enumeration of values (without including the names of the attributes). In an embodiment, the nested data structure processor 330 associates each value of the list with an index of the array corresponding to the list, for example, for the list ["San Francisco", "Chicago", "Atlanta", "Los Angeles"], the value "San Francisco" is the $0^{th}$ element, the value "Chicago" is the $1^{st}$ element, the value "Atlanta" is the $2^{nd}$ element, and so on. In alternative embodiments, the nested data structure processor 330 treats the list of values as an unordered set of values.

User Interface for Preprocessing Data for Big Data Analysis

The data preprocessing system 100 allows users to interact with the data being analyzed for purposes of defining various transformations and generating samples of data. The user interface manager 310 renders user interfaces and sends information describing a user interface for presentation to the user via the client application 210. The screenshots illustrated in FIGS. 4-9 are examples of user interfaces presented to a user visa the client application 210. The data preprocessing system 100 can configure the user interfaces in various ways, for example, by using different widgets than those indicated in the user interfaces, arranging the various user interface elements in different positions than indicated, and so on.

Figure 4:
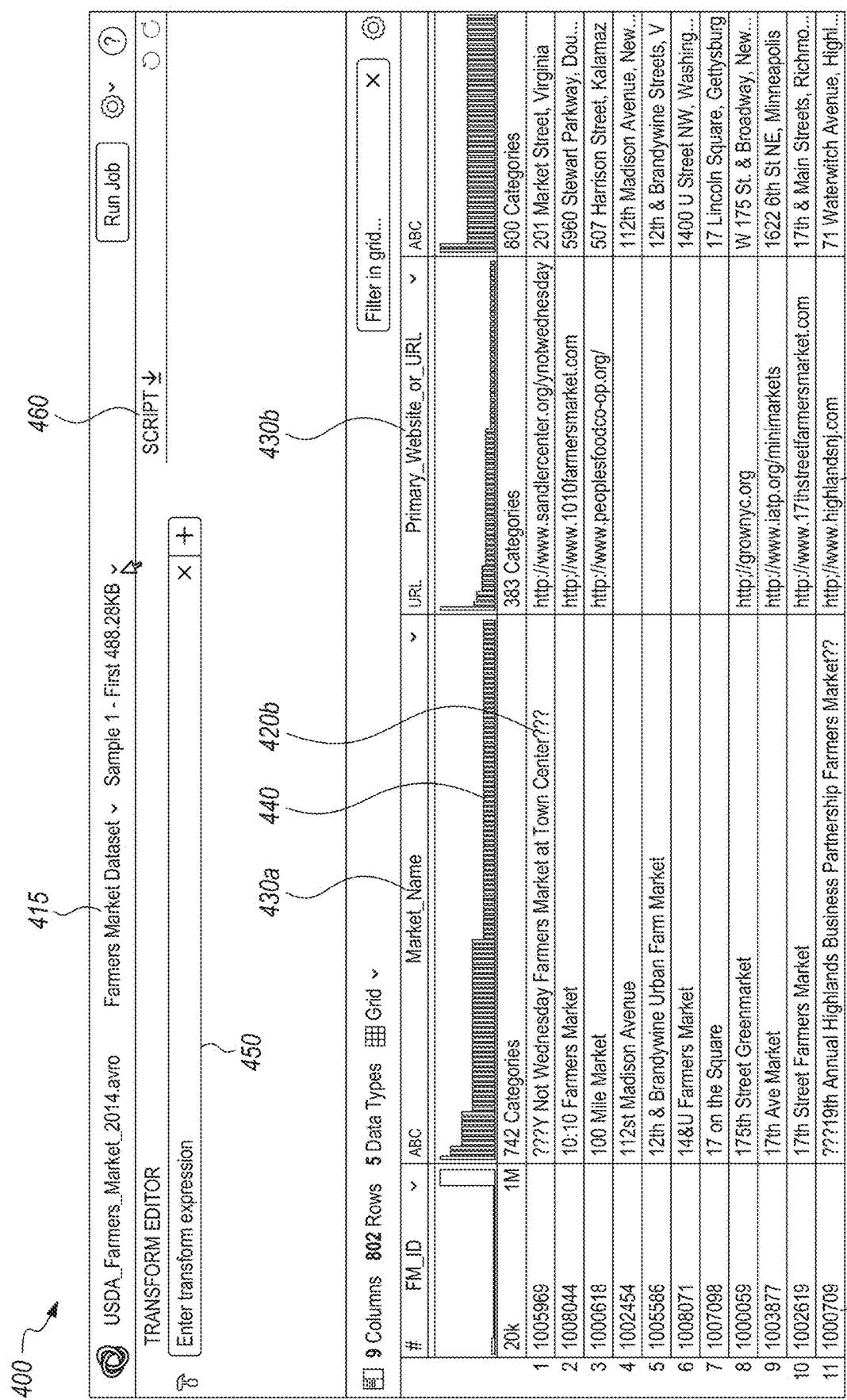
FIG. 4 shows the overall process of receiving interactions of users with data presented to user and generating transformations based on user selections, according to an embodiment.

FIG. 4 shows a screenshot of a user interface 400 showing a subset of data and statistical information describing the data, according to an embodiment. The user interface 400 shown in FIG. 4 shows information describing a dataset identified by the dataset identifier 415 (e.g., "Farmers Market Dataset".) A user may upload the dataset from a source of dataset that can be an external system, a file stored on a local machine or in the cloud, or any other mechanism for storing the data. The user specifies a dataset identifier 415 for each dataset that is loaded. The process of loading the dataset is not illustrated in the screenshot of FIG. 4 and occurs before the data preprocessing system 100 presents the user with the screenshot shown in FIG. 4.

The user interface 400 shown in FIG. 4 presents a subset of data of the dataset being processed. The screenshot shows only a subset of data since the entire dataset is typically too large to be displayed at once via the user interface. The dataset shown in FIG. 4 represents information describing farmers markets.

The dataset includes a set of attributes 430 (an attribute may also be referred to as a data field.) Each attribute stores a type of data. For example, the attribute 430*b* stores a URL (uniform resource locator), the attribute 430*a* stores a textual description of a farmer's market. As shown in FIG. 4, each attribute 430 is represented as a column with the name of the attribute 430 displayed at the top of the column.

A type of the attribute is associated with certain formatting rules (or type rules) associated with the data. An attribute 430 defines characteristics of the data of the attribute. For example, the attribute 430b represents a URL that is expected to be of the format "http:" followed by a website address. The attribute 430 storing description of the farmer's markets may be associated with the attribute 430 that the text representing the description may not include certain special characters, such as '?'.

The subset of data presented in the user interface 400 comprises a plurality of records. Each record comprises values for each attribute of the dataset. A value may be empty. A record is identified by a record identifier 410 that represents a unique value associated with the record. As shown in FIG. 4, the data of the dataset is organized as rows and columns, with each column representing an attribute and each row representing a record.

An attribute 430 may store data that does not conform to the formatting rules associated with the attribute. For example, data element 420a stores value "http;www.highlandsnj.com" that does not conform to the formatting rules of the attribute. Specifically, the data element 420a is not of the form "http:" followed by the web page address since it stores a prefix "http;". Similarly, data element 420b does not conform to the formatting rules of the description field since it includes '?' characters.

The user interface 400 presents statistical information describing the attributes. As shown in FIG. 4, the user interface 400 shows visualization of the data distribution 440 of each field. In an embodiment, a visual representation of an attribute shows geometric shapes representing statistical information describing the attribute. The data distribution 440 is shown using a visual representation such as a chart.

As an example, statistical information describing an attribute is shown as a histogram. The histogram may be represented as a bar chart such that each bar represents a distinct data value of the data elements of the attribute. Alternatively, each bar may represent a set of values of the data elements of the attribute. For example, if an attribute occupies a very large number of distinct values, the data preprocessing system 100 divides the attribute values into buckets. Each bar of the histogram displayed represents a bucket representing a set or range of values of the data elements of that attribute.

The user interface 400 allows users to interact with the geometric shapes of the visual representation of an attribute, for example, bars of a histogram representing the data distribution 440 of the attribute. For example, if a user hovers over (or selects) a particular bar of the histogram with a pointing devices such as a mouse, the user interface 400 displays information describing that particular bar including the number of elements of the dataset having the data value or data values associated with the bar and/or the data value or data values corresponding to the bar. Other interactions of the user with the bar are further described herein.

The user interface 400 shown in FIG. 4 presents the user with a text field 450 for allowing users to input transformations. A user may specify a transformation (also referred to as transformation rules or transformation operation or a transform) for preprocessing the data of a dataset thereby increasing the amount of data that can be analyzed by the big data analysis system 130. For example, the transformations may process data elements having data formatting errors as described above to eliminate the errors.

The transformations added by the user are included in the transformation script 460. FIG. 4 shows the transformation script as empty since the user has not yet added any transform operations to the transformation script 460. However, as the user interacts with the dataset via the user interface 400, the user adds transformations using the text field 450 that are included in the transformation script 460.

FIG. 5 shows the overall process for preprocessing data in preparation for analysis by a big data analysis system, according to an embodiment. In an embodiment, the data preprocessing system 100 performs the steps of the process illustrated in FIG. 5. Various steps discussed can be executed in an order different from that shown herein. Furthermore, specific steps can be executed by modules different from those indicated herein.

The user interface manager 310 receives 500 information identifying a dataset. The information identifying the dataset may be an address of a file stored locally on the data preprocessing system 100, a URI (uniform resource identifier) of a file on a remote system, a file on an external storage attached to the data preprocessing system, and so on. The data preprocessing system 100 uploads the dataset and may store the dataset in the dataset store 380 or may simply store metadata describing the data in the dataset store 380 such that the data itself may be retrieved from the source identified.

The data parsing module 340 parses the data of the dataset and identifies 510 the record separators and cell value separators. The data parsing module 340 also determines any structural information of the individual cell values, for example, whether a cell stores a single value, an array value, a nested data structure, and so on. The data parsing module 340 is configured to parse various ways of representing nested data structures, for example, XML, JSON, HTML, and so on.

The sampling module 360 samples the dataset to determine 520 a sample dataset for preprocessing. Typically, a dataset being processed by the big data analysis system 130 is large. As a result, preprocessing based on the entire dataset can be a slow process. Therefore, the sampling module 360 determines 520 a sample of the dataset. The data preprocessing system 100 presents the sample of the dataset or a portion of the sample of the dataset to the user via the client application 210.

The data preprocessing system 100 builds 530 the transformation script for preprocessing the data via interactions with a user. The data preprocessing system 100 builds the transformation script by interacting with the user via the client application 210. The transformation script comprises a sequence (or series) of transformations. These transformations transform the data so as to conform at least a portion of the data of the dataset to a form that can readily be processed by the big data analysis system 130.

The data preprocessing system 100 (or any other system) preprocesses 540 the entire dataset that needs to be analyzed by executing the transformation script on the dataset. In an embodiment, the data preprocessing system 100 reads records of the dataset and executes the transformation script on the records. The data preprocessing system 100 sends 550 the preprocessed dataset for analysis by the big data analysis system 130. The amount of data of the preprocessed dataset that can be analyzed by the big data analysis system 130 is larger than the amount of the original data from the input dataset that can be analyzed by the big data analysis system 130. This is so because a larger portion of the preprocessed dataset conforms to the formatting rules of the big data analysis system 130.

Figure 6:
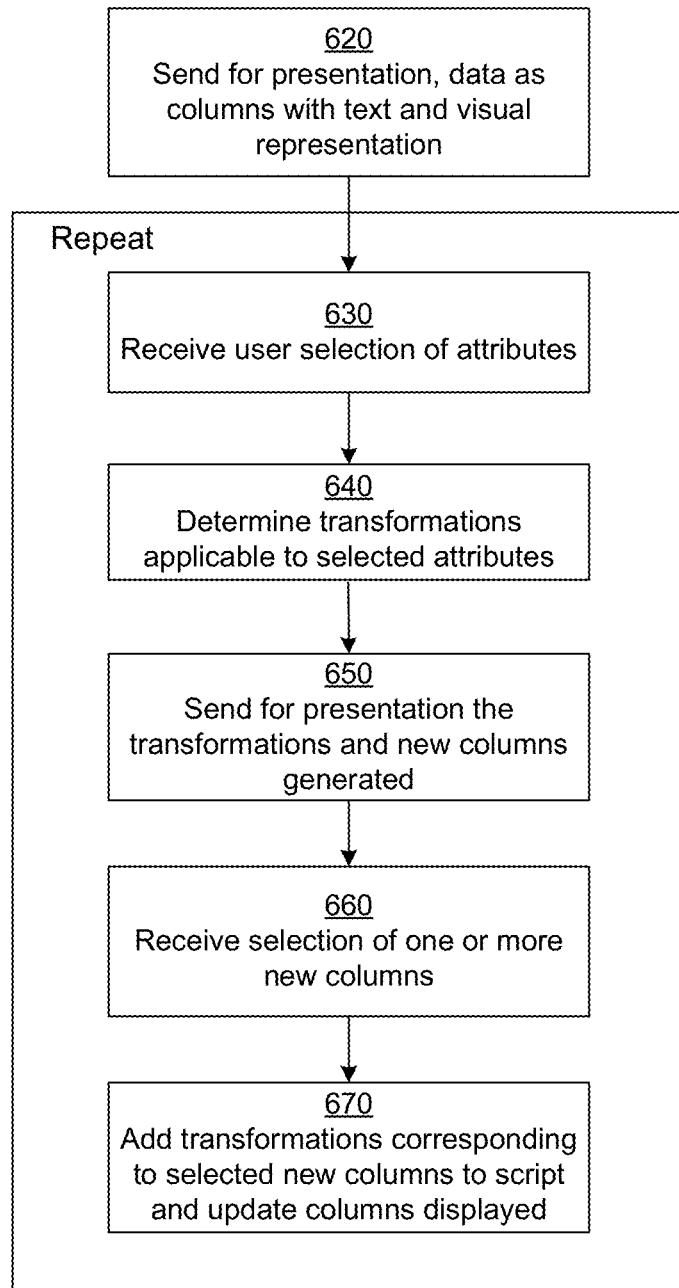
FIG. 6 shows the overall process of building the transformation script based on interactions with users, according to an embodiment.

FIG. 6 shows the overall process of building the transformation script based on interactions with users, according to an embodiment. Various steps discussed can be executed in an order different from that shown herein. Furthermore, specific steps can be executed by modules different from those indicated herein.

The user interface manager 310 sends 620 for presentation, the data of the input dataset via a client application 210. The user interface manager 310 sends data in a textual representation to be presented as rows and columns. The user interface manager 310 also sends visual representation of data of the dataset for presentation via the client application 210. In an embodiment, the visual representation includes geometric shapes based on statistical information describing attributes of the dataset. The visual representation determines certain characteristic of each geometric shape is based on statistical information describing the attribute. Examples of characteristics of a geometric shape include the size (length or width) of the shape, color of the shape, a shading of the shape, and so on. Examples of statistical information include a frequency of occurrence of the attribute in the column. An example of visual representation is a histogram for each column wherein the geometric shapes are bars such that the length of a bar depends on the frequency of occurrence of a value associated with the bar.

If an attribute corresponding to a column of the dataset is a simple attribute, the user interface manager 310 generates a histogram for the column indicating the number of times each distinct value of the attribute occurs in the column. If an attribute corresponding to a column is a set or an array, the user interface manager 310 generates a histogram for the column indicating the number of times each distinct value occurs in the arrays stored in the column. For example, the same value may occur multiple times within the same array.

If an attribute corresponding to a column is a composite attribute represented as name value pairs, the user interface manager 310 generates a histogram representing the number of times each name (or key) corresponding to an attribute of the composite attribute occurs within the column. In an embodiment, the histogram of the column corresponding to the composite attribute shows only the attributes at the highest level of the composite attributes. Accordingly, the histogram does not show frequency of occurrences of attributes of composite attributes nested within the composite object.

The nested data structure processor 230 determines the frequency of occurrence of each attribute of a composite attribute. The nested data structure processor 230 may process all cell values of the column of the dataset (or a sample of the dataset) to determine the frequency of occurrence of a value of the attribute. For example, if a composite object represents an address including attributes apartment, suite, unit, and so on, some cell values may specify suite number, some cell values may specify a suite number, some cell values may specify a unit number, and some cell values may specify none of these attributes. Accordingly, the nested data structure processor 230 determines the frequency of occurrence of each of these attributes and generates a histogram.

The data preprocessing system 100 allows a user to interactively build a transformation script for transforming the dataset. The transformation script comprises a set of transformation operations or a sequence of transformation operations for applying to the dataset. These transformations provide a transformed (or modified or cleaned up) version of the dataset that is easier for a data analysis system to process. For example, if the dataset includes data that does not conform to certain formatting rules that the big data analysis system 130 expects, the data preprocessing system 100 transforms the data so as to make sure that the transformed data conforms to the formatting rules of the big data analysis system 130. As an example, if the big data analysis system 130 is not configured to process nested data structures, the transformation script unnests the nested data structure. In other words, the transformation script removes the nesting of attributes nested within the nested data structures by extracting these attributes and storing values of these attributes as new columns of the dataset.

The process of iteratively building the transformation script comprises the following steps executed repeatedly. The user interface manager 310 sends information describing the dataset for presentation to the user via the client application. The information describing the dataset includes information describing one or more simple attributes and one or more composite attributes. The data preprocessing system 100 receives a user selection of one or more attributes of the dataset. The user selection may be received via the visual representation of the attribute or via a textual representation of data values of the attribute.

The user selection may identify attributes of a composite attribute presented as a column. For example, assume that the user interface manager 310 presents the visual representation of the complex attribute as a histogram wherein each bar represents the frequency of occurrence of an attribute of the composite attribute. The user interface manager 310 receives the user selection of one or more attributes based on selection of one or more bars (or geometric shapes) describing the one or more attributes. Alternatively, the user interface manager 310 receives selection of the attributes based on selection of text identifying the name of the attribute in a name-value pair. The user interface manager 310 may receive a selection of the name from any cell value (i.e., instance of the composite attribute) in which the attribute has a value.

The transformation recommendation module 350 determines transformations applicable to the dataset based on the selected attributes. For example, if the user interface manager 310 receives a selection of an attribute, the transformation recommendation module 350 generates an unnest transformation that extracts the value of the selected attribute from each cell value of the column and shows it as a cell value in a new column added to the dataset corresponding to that attribute. In an embodiment, the data preprocessing system 100 generates a name for each new column created based on the name of the attribute being extracted. If the attribute being extracted is a nested attribute, the data preprocessing system 100 generates a name for the new column based on all the attributes traversed to reach the attribute starting from the top level composite object.

In an embodiment, the user interface manager 310 sends for presentation, the transformations generated as well as the new columns generated based on the transformations. For example, the user interface manager may receive a selection of a plurality of attributes. The transformation recommendation module 350 may generate multiple recommended transformations corresponding to each selected user attribute. The user interface manager 310 sends for presentation all the columns obtained by applying the recommended transformations to the selected attributes.

The user interface manager 310 further receives 660 a selection of the columns or the recommended transformations. For example, user interface manager 310 may present multiple new columns for a particular attribute. The user may select a new column corresponding to the attribute based on a particular transformation. Alternatively, the user may decide not to select a new column corresponding to an attribute after reviewing the data values of the new column generated.

The transformation recommendation module 350 adds 670 the transformations corresponding to the selected new columns (or any transformations explicitly selected by the user) to the transformation script. The user interface manager 310 adds the selected new columns (or columns corresponding to any transformations explicitly selected) to the dataset.

The steps 630, 640, 650, 660, and 670 described above may be repeated multiple times based on interactions with users. For example, the user may extract one or two attributes of a composite attribute in each iteration and add them to the dataset. Similarly, the user may unnest deeply nested data structures a level at a time, i.e., by extracting the next level of composite attribute in each iteration.

In an embodiment, the user interface manager 310 receives a selection of an entire composite attribute instead of specific attributes of the composite attribute. In this embodiment, the transformation recommendation module 350 generates transformations for extracting all the top level attributes of the composite attribute and the user interface manager 310 sends new columns corresponding to these attributes for display. The user may subsequently select a subset of these extracted attributes. Alternatively, the user may continue to unnest other composite attributes.

Figure 7:
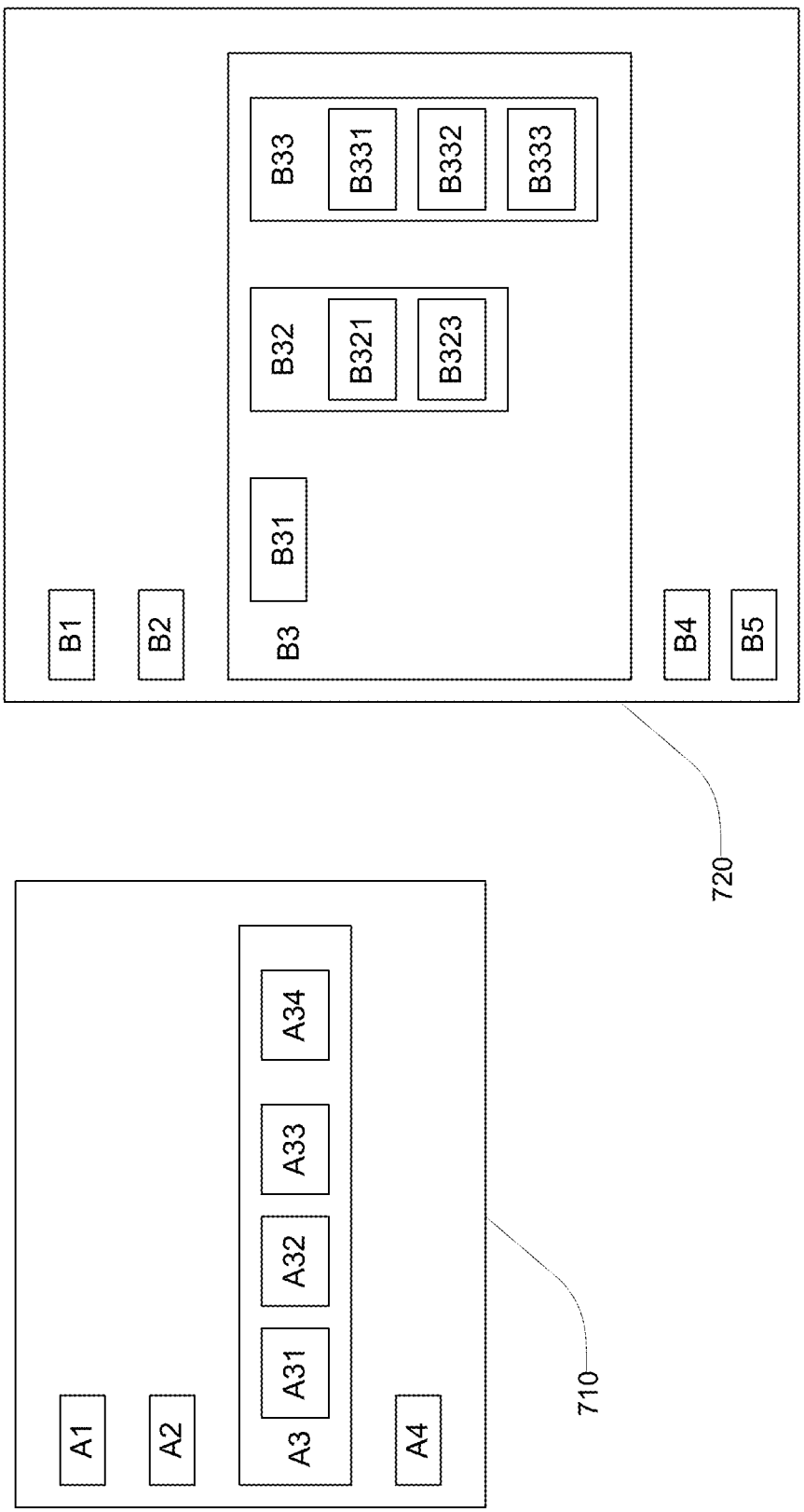
FIG. 7 shows examples of composite attributes processed by the data preprocessing system, according to an embodiment.
Figure 8:
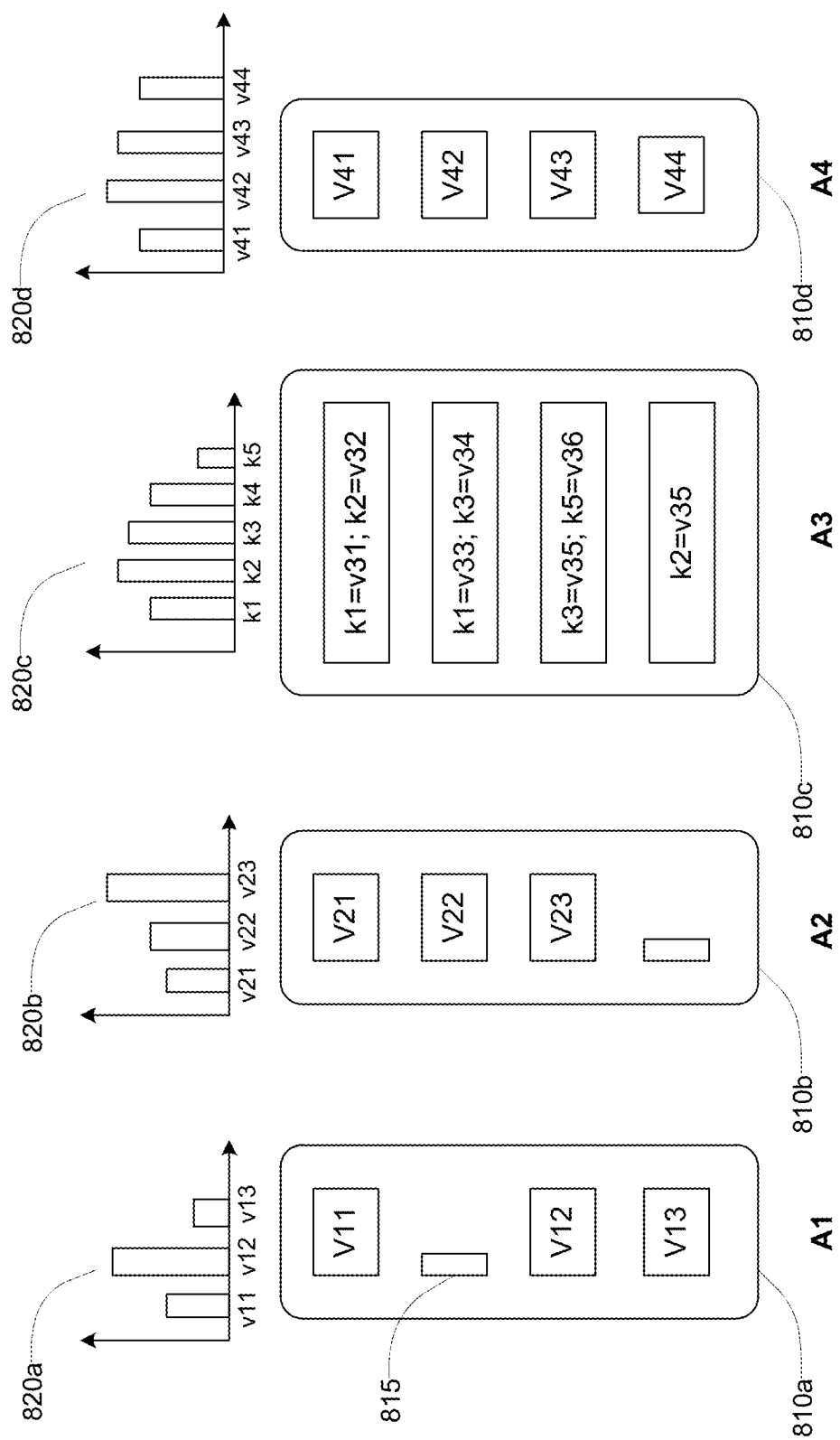
FIG. 8 shows presentation of a dataset including simple attributes and composite attributes, according to an embodiment.
Figure 9:
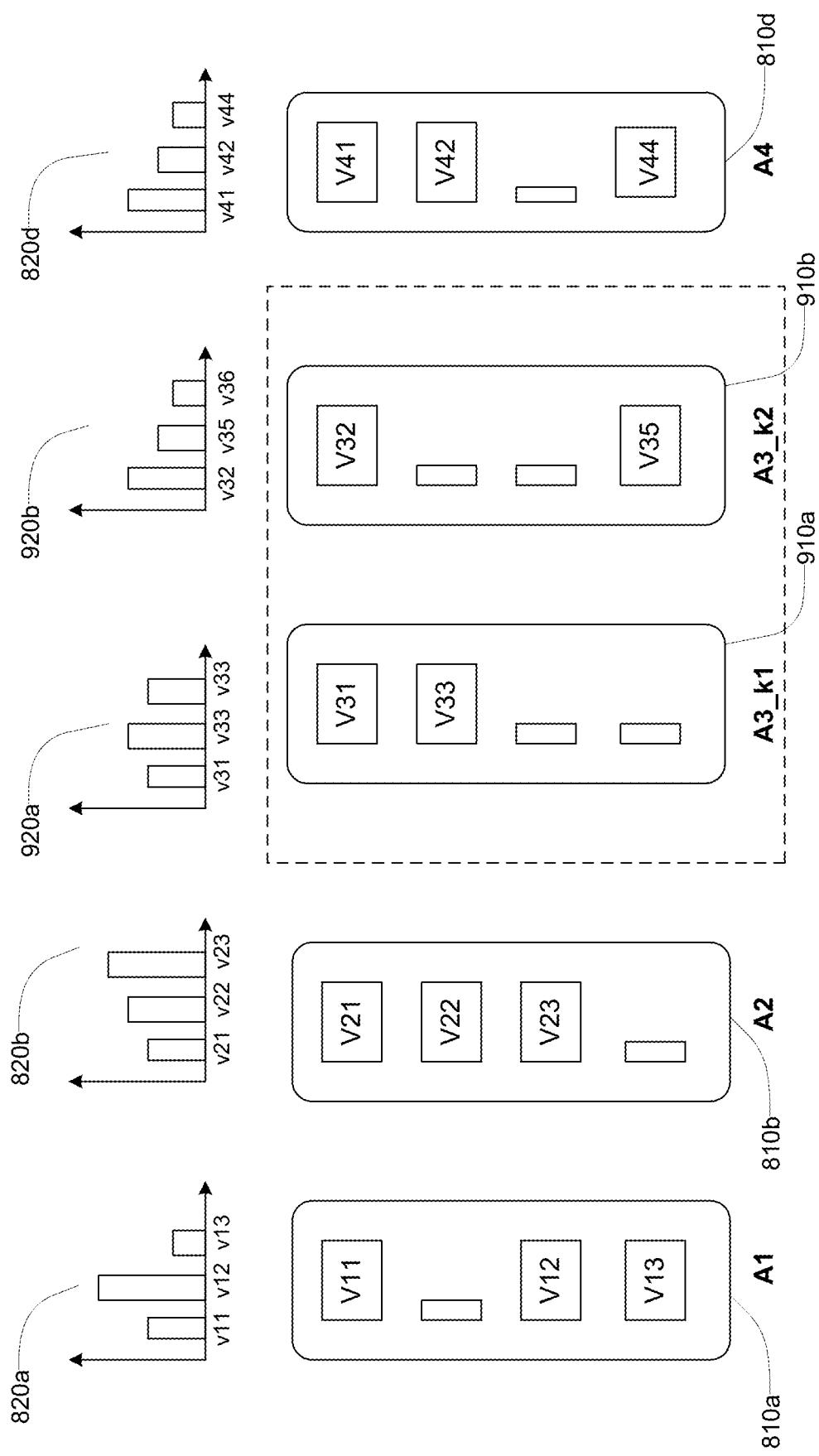
FIG. 9 shows presentation of the dataset with some of the attributes of a composite attribute unnested, according to an embodiment.

FIGS. 7-9 illustrate how the data preprocessing system 100 allows a user to unnest a composite attribute so as to extract one or more attributes of the composite attribute as columns of the dataset.

FIG. 7 shows examples of composite attributes processed by the data preprocessing system, according to an embodiment. FIG. 7 shows two examples of composite attributes. The composite attribute 710 includes four attributes at the top level, A1, A2, A3, and A4. The attribute A3 is itself a composite attribute including attributes A31, A32, A33, and A34. Accordingly, the data preprocessing system 100 processes composite attributes comprising other composite attributes. The data preprocessing system 100 represents composite attributes using nested data structures. The composite attribute 710 has a nested depth of 2 levels.

Each attribute within the composite attribute may be represented using a name-value pair. The structure 710 represents the structure of a composite attribute. However, specific instances of the composite attributes may include fewer attributes than those shown in FIG. 7. For example, certain instances of the composite attribute in the dataset may include attributes A1, A2, and A3. Other instances may include A2, A3, and so on. Similarly, different instances may include different sets of attributes within the nested attribute A3.

FIG. 7 shows another example of composite attribute 720 processed by the data preprocessing system 100 illustrating greater depth of nesting than 710. The composite attribute 720 includes attributes B1, B2, B3, B4, and B5. The attribute B3 is a composite attribute including attributes B31, B32, and B33. Of these three attributes, B32 and B33 are also composite. Accordingly, the composite attribute 720 has a nested depth of three levels.

In an embodiment, the user interface manager 310 uses the geometric shapes shown in FIG. 7 to represent the corresponding composite attributes. Accordingly, the user interface manager 310 represents nesting of composite attributes by nesting the shapes representing the composite attributes. In other words, the user interface manager 310 represents an attribute within a composite attribute as a geometric shape within another geometric shape such that the outside geometric shape represents the composite attribute and the inner geometric shape represents the attribute within the composite attribute.

FIG. 8 shows presentation of a dataset including simple attributes and composite attributes, according to an embodiment. Assume that the user interface manager 310 sends for presentation via the client application 210, a dataset comprising a composite attribute 710. The user interface manager 310 receives a request to unnest all the attributes of the composite attribute 710. The user interface manager 310 may receive this request as a result of the user selecting the column storing the composite attribute 710. Alternatively, the user interface manager 310 may receive a request to unnest a subset of the attributes of the composite attribute as a result of the user selecting the set of columns corresponding to the subset of attributes.

The nested data structure processor 230 unnests a composite attribute 710 stored in a column of the dataset and sends the data corresponding to each attribute of the composite attribute for presentation as a new column to the user interface manager 310. The user interface manager 310 shows the columns as shown in FIG. 8. Accordingly, user interface manager 310 shows each attribute of the composite attribute 710 as a separate column. The user interface manager 310 shows for each column 810, data of the cell values of the column in textual form. Examples of cell values for column 810a are shown as V11, V12, and V13. Certain values of the cells may be empty as shown in cell 815. As shown in FIG. 8, columns 810a, 810b, and 810d store simple attributes and column 810c stores a composite attribute.

The user interface manager 310 shows visual representation 820 of data of each attribute. As shown in FIG. 8, the visual representation is a histogram showing frequency of occurrences of values associated with an attribute. In other embodiments, the user interface manager 310 may show geometric objects associated with values of the attributes, for example, rectangles, sectors, elliptical shapes and so on. A geometric object shown by the user interface manager 310 in the user interface may represent statistical information describing the attributes.

As shown in FIG. 8, the user interface manager 310 shows the visual representation of a simple attribute as a histogram showing statistical information of each distinct value of the attribute within the column storing the attribute values. The statistical information shown by the user interface manager 310 may be frequency of occurrence of each distinct value of the attribute within the column. If the dataset is modified to include data having additional values of the attribute, the user interface manager 310 updates the histogram to show the frequency of occurrence of the additional values. In an embodiment, the user interface manager 310 shows frequency of occurrence of ranges of values of the attribute within the column.

The user interface manager 310 shows the visual representation of a composite attribute as a histogram showing statistical information of each attribute within the composite attribute at the top level. For example, if the composite attribute stores attributes within the composite attribute as name-value pairs, the visual representation 820c shows the frequency of occurrence of each key within the column. As shown in FIG. 8, each cell value of the column 810c may store a different set of name-value pairs. Accordingly, the number of times the key k1 occurs in the column 810*c* may be different from the number of times key k2 occurs, which in turn may be different from the number of times key k3 occurs, and so on.

The user interface manager 310 may receive selection of attributes within the composite attribute A3, with a request to unnest these selected attributes. For example, assume that the user interface manager 310 receives a request to unnest attributes represented by keys k1 and k2. The user interface manager 310 may receive the selection of these keys via the visual representation 810*c* or via selection of text from the cell values of the column 810*c*.

FIG. 9 shows presentation of the dataset with some of the attributes of a composite attribute unnested, according to an embodiment. As shown in FIG. 9, the user interface manager 310 shows two new columns corresponding to the attributes corresponding to keys k1 and k2. The user interface manager 310 shows these attributes as new columns 910*a* and 910*b*. The user interface manager 310 also shows visual representations 920*a* and 920*b* of the new columns 910*a* and 910*b*. If the composite attribute has several levels of nesting, for example, composite attribute 720 shown in FIG. 7, the data processing system 100 may be used to unnest these attributes level by level.

Screenshots of User Interface Illustrating Unnesting of Attributes

Figure 10:
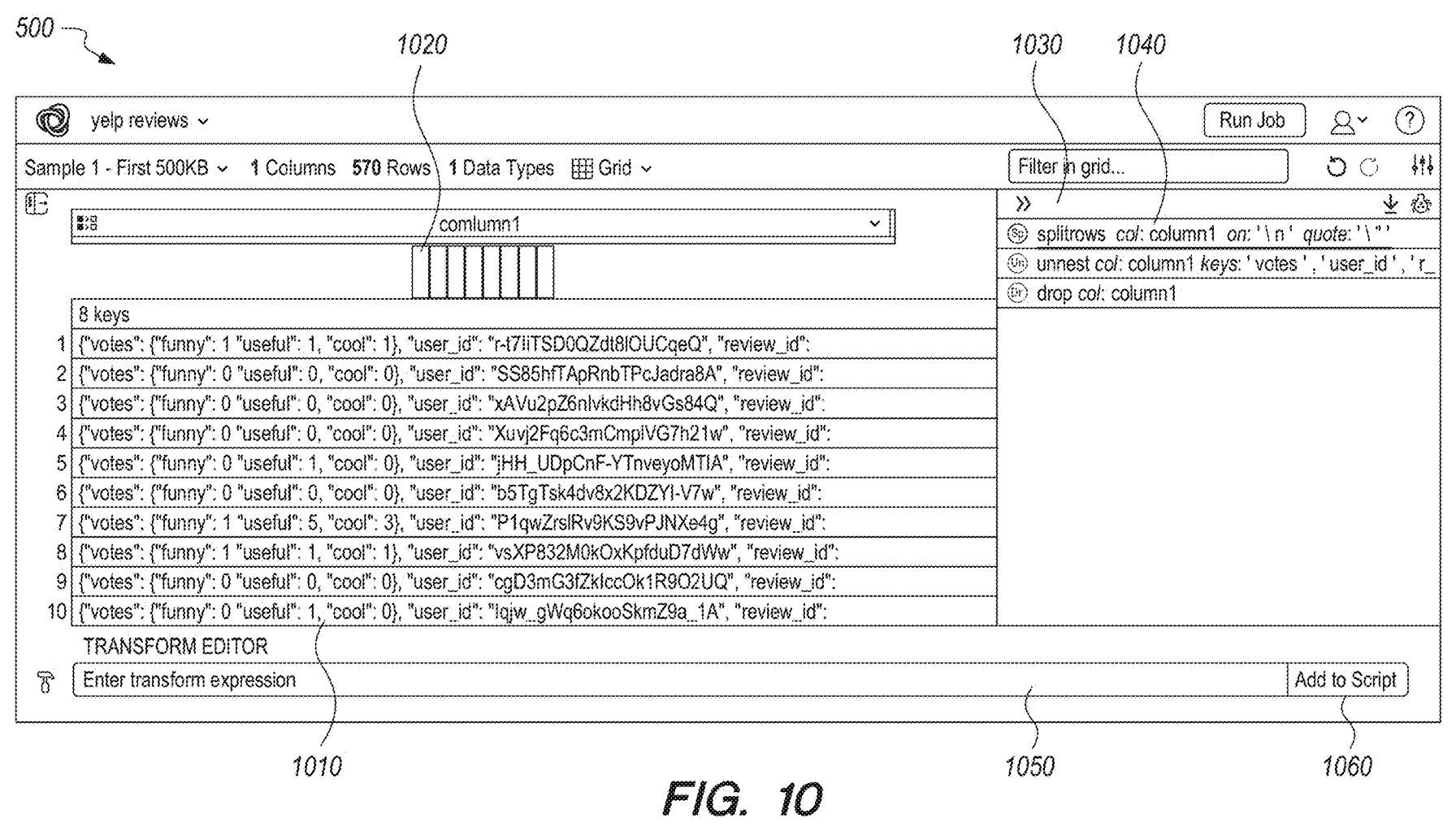

FIG. 10 shows a screenshot of a user interface showing a dataset including a composite attribute, according to an embodiment. As shown in FIG. 10, the dataset includes a single composite attribute. Accordingly, each record of the dataset includes a value of a single composite attribute. The values are represented using name-value pairs. The example dataset shows reviews of businesses provided by a website that allows user to rate businesses, for example, YELP.

The user interface manager 310 shows the values 1010 of the column. The user interface manager 310 provides a name for the column, for example, "column1." The user interface manager 310 also shows a histogram showing frequency of occurrence of different attributes in the records of the dataset. As shown in FIG. 10, the composite attribute includes attributes names "votes", "user_id", "review_id" and so on. The attribute "votes" is a composite attribute. The user interface manager 310 also shows transformation operations 1040 being added to a transformation script 1030. The data preprocessing system 100 builds the transformation script 1030 based on interactions of the user interface manager 310 with the user.

The user interface manager 310 also presents the user with a transform editor 1050 for allowing users to edit a transformation of the transformation script 1030. For example, a user can select a specific transformation of the transformation script and edit it using the transform editor 1050. In an embodiment, the user interface manager 310 presents each transformation in the transform editor 1050 before adding to the transformation script. This provides the user with a chance to modify the transformation if necessary. After modification or without modification, the user can add the transform to the transformation script using the "add to script" button 1060.

Figure 11:
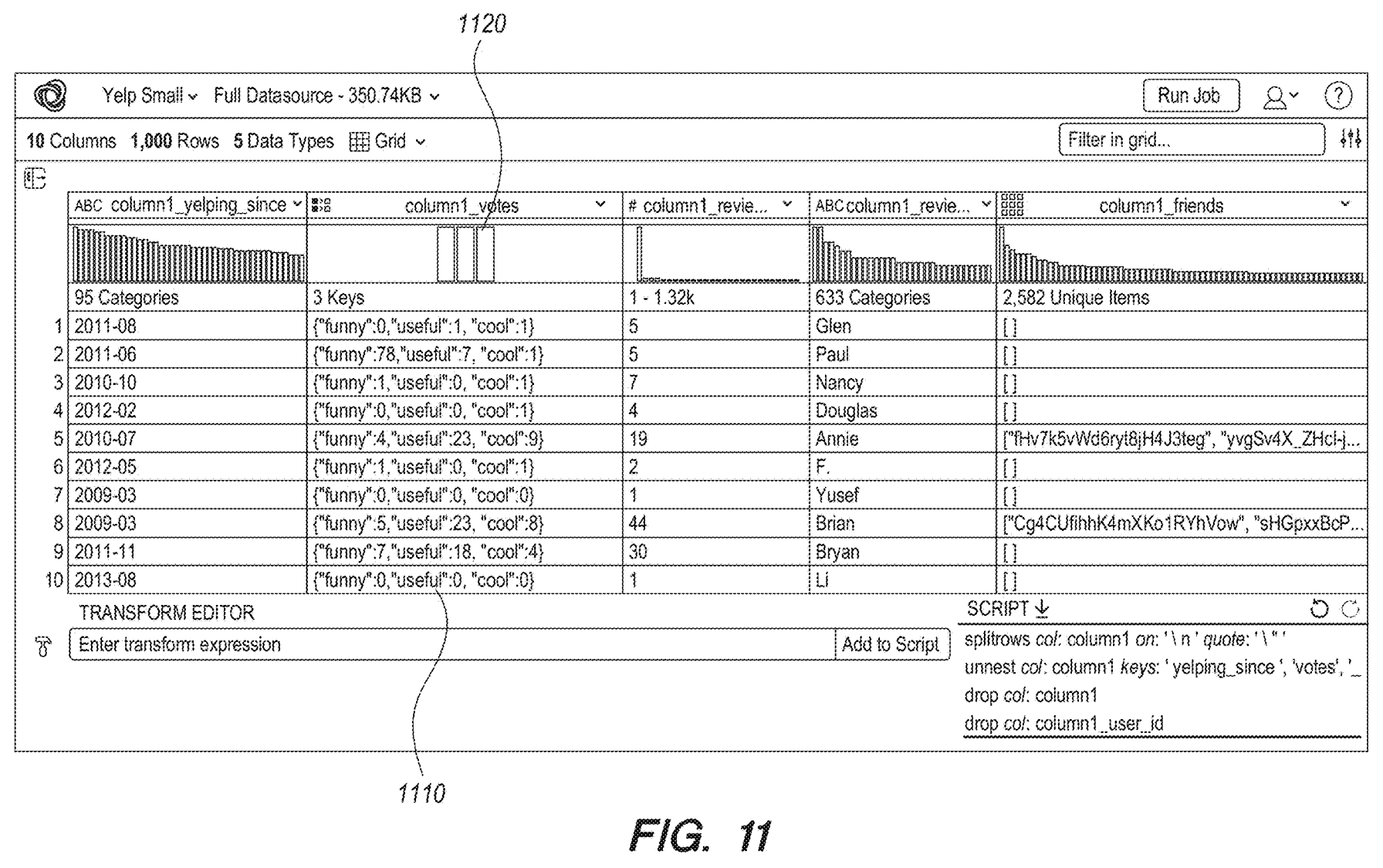

FIG. 11 shows a screenshot of a user interface showing a composite attribute unnested into a plurality of columns of the dataset, according to an embodiment. In an embodiment, the user interface manager 310 receives a selection of the composite attribute, thereby requesting the unnesting (or extraction) of each of the top level attribute of the selected composite attribute. Accordingly, the data preprocessing system 100 extracts each attribute of the composite attribute into a new column. However, the data preprocessing system 100 does not extract attributes nested within attributes of the composite attribute. For example, if a top level attribute is a composite attribute, the data preprocessing system 100 shows that top level attribute as a single new column in which each value is a representation of a value of the top level attribute, for example, as a JSON string.

As shown in FIG. 11, the data preprocessing system 100 extracts various attributes including "yelping_since", "votes", "review_count", "name", "friends", and so on. The data preprocessing system 100 extract each attribute as a new column. Note that the "votes" attribute is a composite attribute but the data preprocessing system 100 does not extract individual attributes within the "votes" attributes into their own columns. Instead the data preprocessing system 100 extracts the values of the composite attribute "votes" into a single column 1110. The user interface manager 310 also presents statistical information describing each column, for example, as histograms 1120.

In an embodiment, the data preprocessing system 100 receives a selection of a subset of attributes of the composite attribute shown in column 1010 of FIG. 10. The selection of the attributes may be received via the histogram 1020, for example, as a selection of one or more bars of the histograms. Alternatively, the selection of attributes may be received as selection of text representing the attribute names in the data of the column 1010. In this embodiment, the data preprocessing system 100 extracts only the selected attributes into new columns.

Figure 12:
FIG. 12 shows a screenshot of a user interface showing unnesting of a composite attribute within a composite attribute of the dataset, according to an embodiment.

FIG. 12 shows a screenshot of a user interface showing unnesting of a composite attribute within a composite attribute of the dataset, according to an embodiment. As shown in FIG. 12, the user interface manager 310 receives the selection of the composite attribute 1220 (that corresponds to composite attribute 1120 shown in FIG. 11) or selection of one or more attributes within the composite attribute 1220. The data preprocessing system 100 extracts attributes of the composite attribute 1220 into new columns 1210*a*, 1210*b*, and 1210*c* of the dataset.

Accordingly, FIGS. 10, 11, and 12 illustrate how the data preprocessing system 100 allows users to unnest (or extract) attributes by going deeper into a composite attribute level by level. At each level, attributes at that particular level are extracted by the data preprocessing system based on user selections. The data processing system 100 builds the transformation script that can be used for a larger dataset by executing the same set of transformations for unnesting attributes.

Recommending Transformations Based on the User Interface Mechanism Used for Selecting Attributes for Unnesting The transformation recommendation module 350 makes recommendations of transformations based on the user interface mechanism (or widget) used by a user for selecting attributes of a composite attribute for unnesting. The user interface manager 310 provides different user interface mechanisms for allowing users to select attributes of a composite attribute for unnesting. For example, the user interface manager 310 may provide one or more of a visual representation, a textual representation, or a structural representation of a composite attribute that can be used for selecting individual attributes of the composite attribute for unnesting.

The user interface manager 310 determines the specific mechanism used by a user for selecting an attribute and passes the information to the transformation recommendation module 350. The transformation recommendation module 350 makes a transformation recommendation based on various factors including the type of user interface mechanism used for selecting an attribute. In other words, the transformation recommendation module 350 may provide a first set of transformation recommendations for a first user interface mechanism used for selecting an attribute and a second set of transformation recommendations if the user uses a second user interface mechanism for selecting the same attribute. Furthermore, the transformation recommendation module 350 may provide a particular number of transformation recommendations for a first user interface mechanism used for selecting an attribute and a different number of transformation recommendations if the second user interface mechanism is used for selecting the same attribute.

Figure 13:
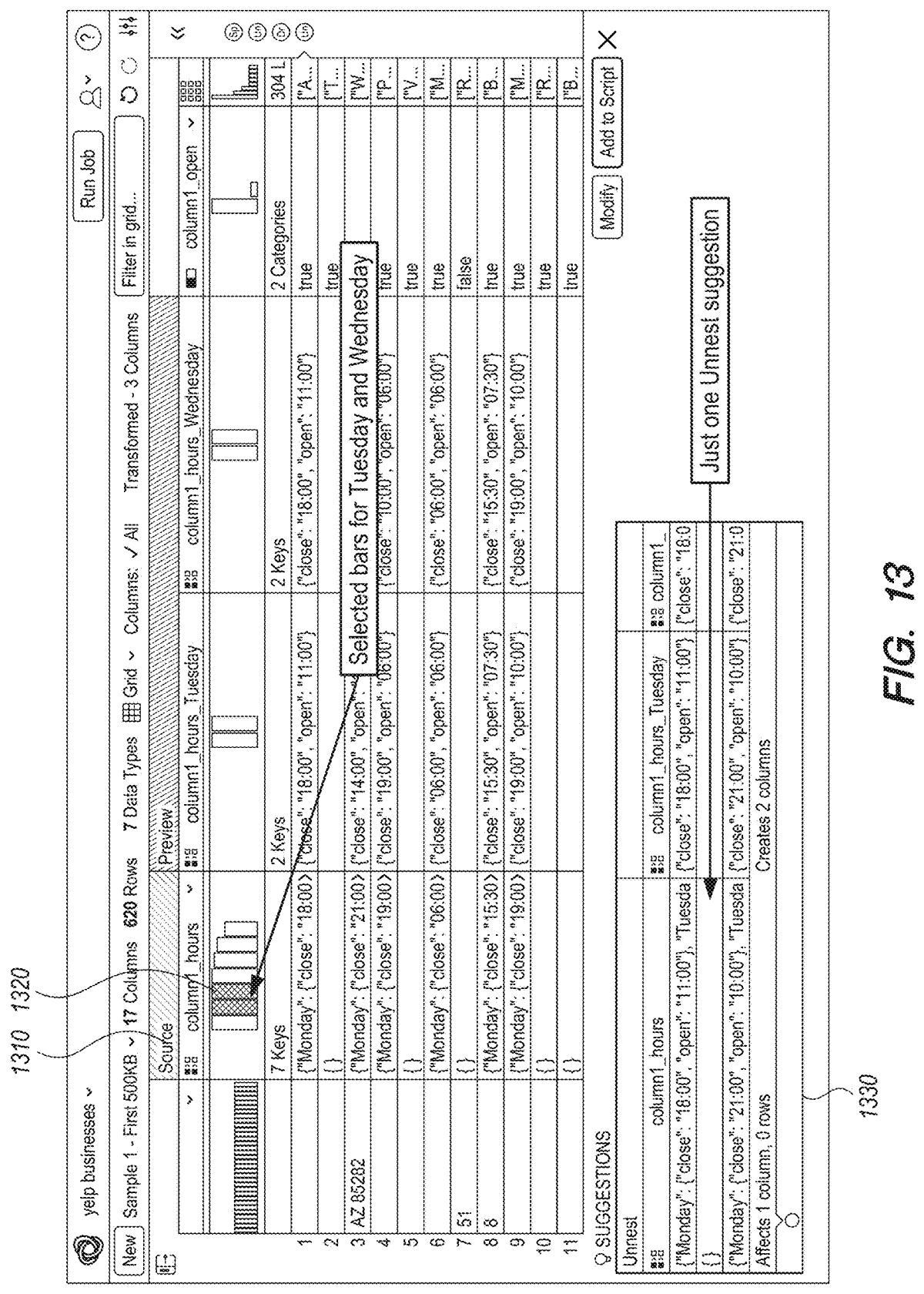

FIG. 13 shows a screenshot of a user interface illustrating recommendations of transformations based on a selection of attributes via a visual representation, according to an embodiment. The user interface shows a column 1310 storing a composite attribute named "hours". The composite attribute named "hours" represents hours of businesses for various days of the week. An example representation of hours of operation of businesses as presented above maps days of weeks to time ranges, for example, {Monday: {9:00 am-5 pm}, Tuesday: {9:00 am-5 pm}, Wednesday: {9:00 am-5 pm}, Thursday: {9:00 am-5 pm}, Friday: {9:00 am-5 pm}, Saturday{9:00 am-1:00 pm} }.

As shown in FIG. 13, the user interface manager 310 receives a selection of one or more days of the week representing attributes of the composite attribute "hours" via the visual representation, i.e., the histogram 1320. In particular, FIG. 13 shows a user selection of attributes "Tuesday" and "Wednesday" made by a user by selecting the corresponding bars of the histogram representing the frequency of occurrence of these two days. The user interface manager 310 provides the information identifying the selected attributes and the fact that the user selection was made via the histogram to the transformation recommendation module 350. The transformation recommendation module 350 generates a single transformation based on the information received. The generated transformation unnests the selected attributes to new columns of the dataset. The transformation recommendation module 350 provides the generated transformation to the user interface manager 310. The user interface manager 310 sends for presentation, the generated transformation as well as the generated columns to the client application 210. The user interface of the client application 210 displays the recommendation (or suggestion) 1330 to the user.

Figure 14:
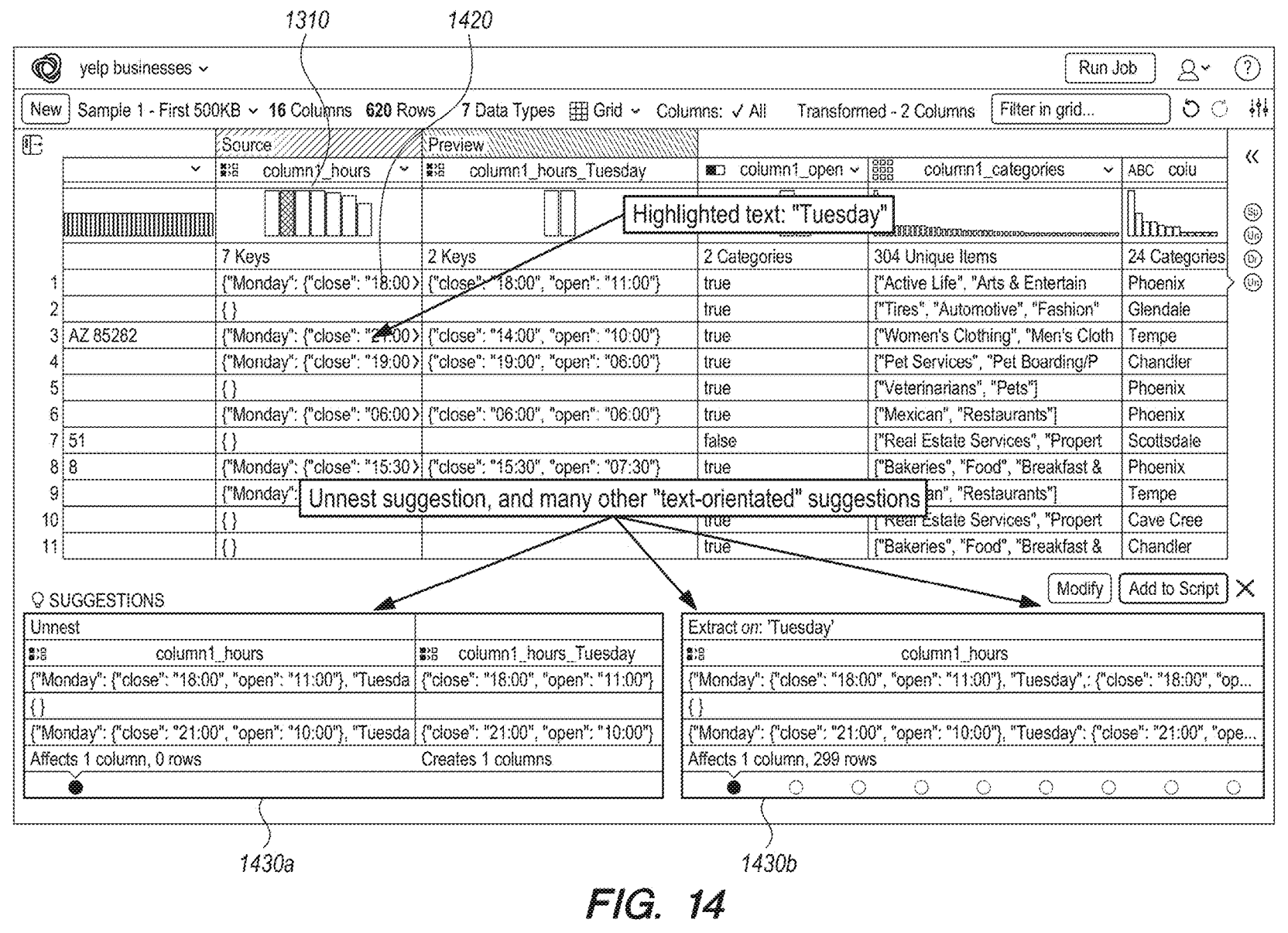

FIG. 14 shows a screenshot of a user interface illustrating recommendations of transformations based on a selection of attributes via a textual representation, according to an embodiment. FIG. 14 shows a user interface displaying the same attribute 1310 as shown in FIG. 13. However, the user selects the attribute "Tuesday" from the "hours" composite attribute using the textual representation of the composite attribute. In other words, the user interface shown in FIG. 14 receives the user selection of the attribute "Tuesday" based on the selection of the text "Tuesday" from the text of a particular value of the composite attribute "hours."

The user interface manager 310 receives the selection of the attribute "Tuesday" and provides information identifying the selected attribute along with the information indicating that the selection was made by a user using the textual representation of the composite attribute value to the transformation recommendation module 350. The transformation recommendation module 350 receives the above information and generates a plurality of recommendations based on the information. The transformation recommendation module 350 provides the generated recommendations of transformations to the user interface manager 310 for display. The user interface manager 310 displays the recommendations including recommendations 1430a and 1430b via the user interface. The recommendations generated by the transformation recommendation module 350 include transformations performing text manipulation (i.e., string manipulation) of the composite attribute values. The transformations generated include the unnest transformation as shown in FIG. 13 along with other transformations. Additional transformations generated by the transformation recommendation module 350 are shown in FIG. 15.

FIG. 15 shows a screenshots of user interfaces illustrating additional recommendations of transformations based on a selection of attributes via a textual representation, according to an embodiment. The transformation recommendation module 350 generates a plurality of transformations including transformation 1510 for splitting the text value of the composite attribute based on the selected string, transformation 1510b for counting occurrences of the selected string within each value of the composite attribute, transformation 1510c for extracting a list based on the selected text, transformation 1510d for replacing the selected string by another string, transformation 1510e for deleting the selected string from the value of the composite attribute and so on.

Accordingly, the transformation recommendation module 350 uses the user interface mechanism used by a user to determine a user intent indicating the type of the value of the composite attribute. The transformation recommendation module 350 determines that the user is treating the composite attribute value as a text and likely intends to perform a text operation based on a selection of a substring of the textual representation of the composite attribute by the user. The transformation recommendation module 350 determines that the user is treating the composite attribute value as a group of attributes and likely intends to perform an unnest operation based on a selection of an attribute using the visual representation or a graphical representation (e.g., by selecting a bar of a histogram) of the composite attribute by the user.

Unnesting Nested Data Structures Using a Structural Representation

In some embodiments, the data preprocessing system 100 presents structural representations of composite attributes. The structural representations show nested attributes at various depths. The structural representation provides information describing the structure of the composite attributes. For example, the structural representation provides information indicating depths of nesting of various attributes. The structural information allows users to select specific attributes that they are interested in processing. The structural representation allows users to select attributes at various depths that may be greater than 1. The data preprocessing system 100 extracts values of each selected attribute and shows the values as a new column along with statistical information describing the selected attributes, for example, histogram showing frequency of occurrence of distinct values of the attribute.

Figure 16:
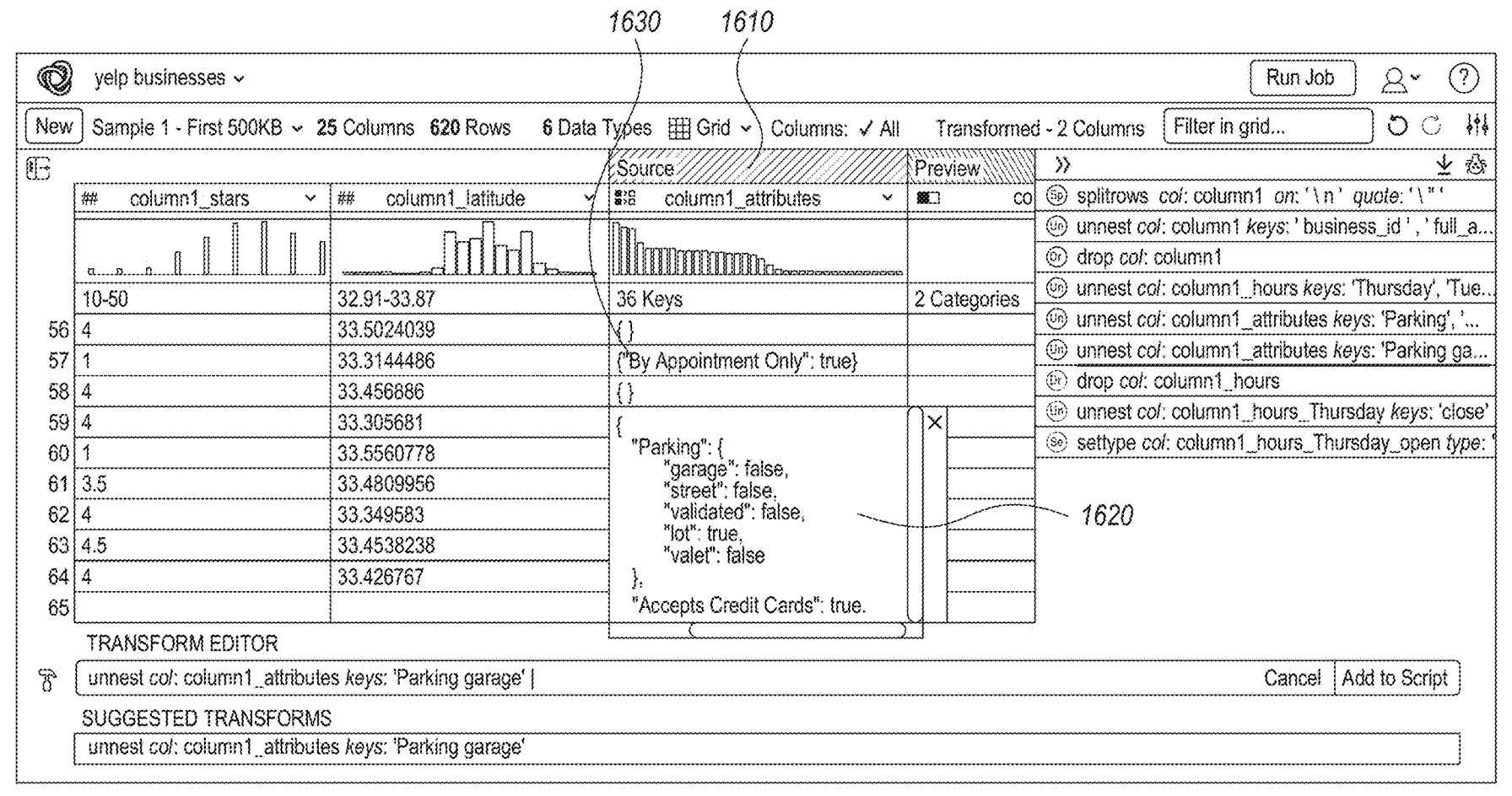
Figure 17:
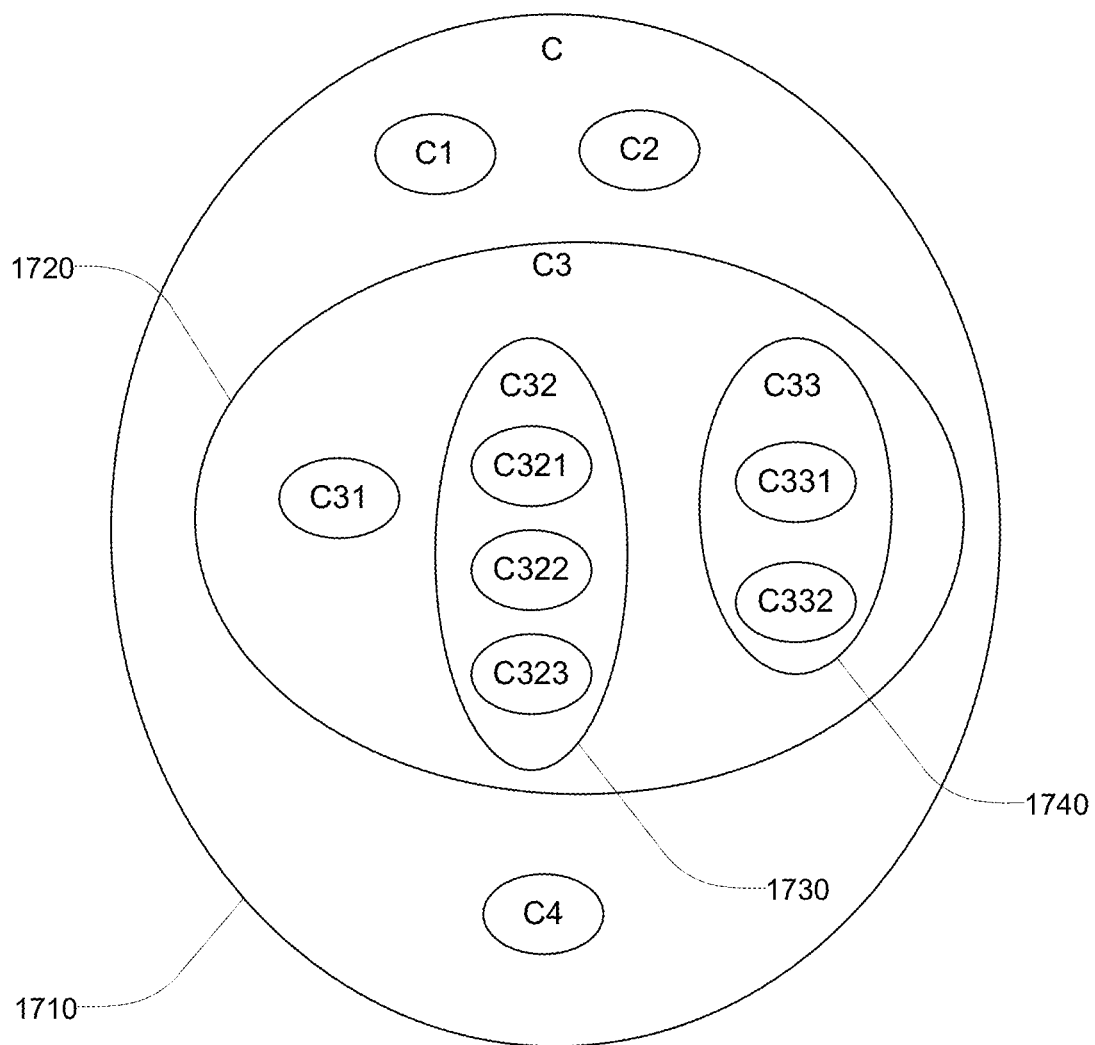
FIG. 17 illustrates a structural representation of values of a composite attribute based on geometric shapes indicating nesting of attributes within the composite attribute, according to an embodiment.
Figure 18:
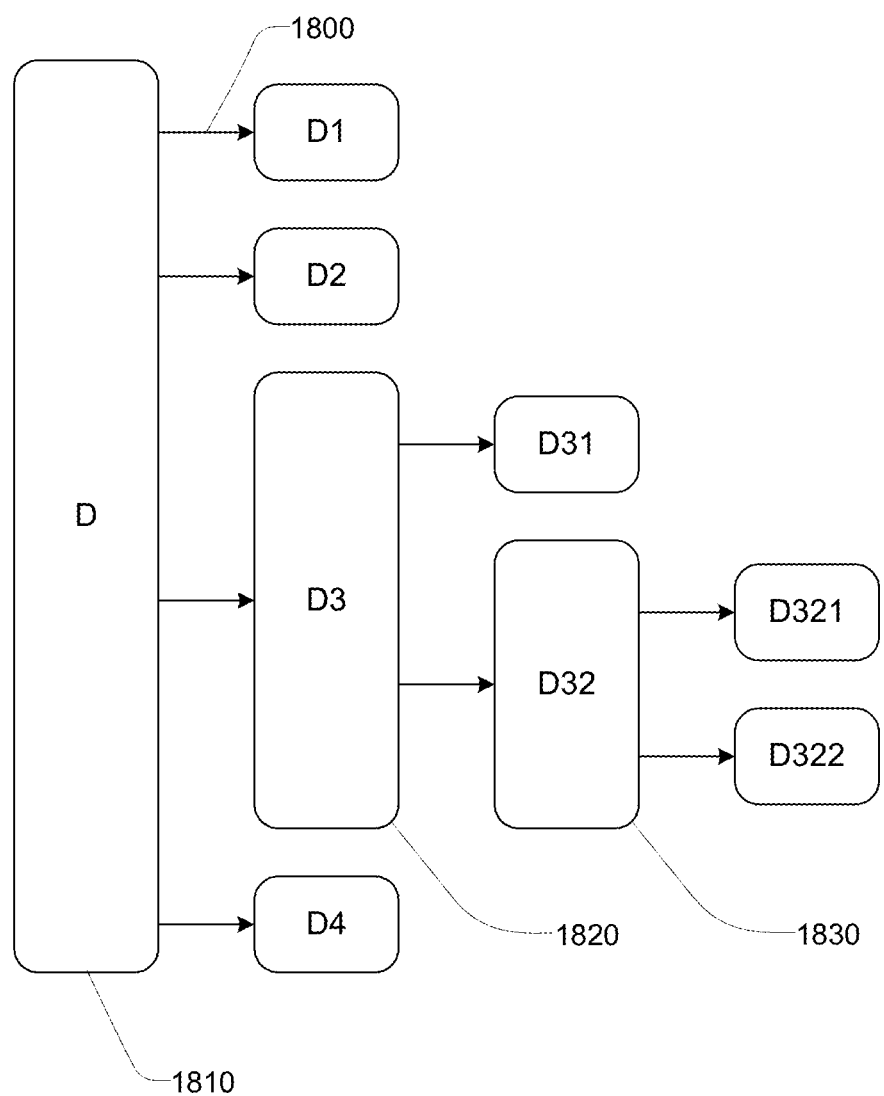
FIG. 18 illustrates a structural representation of values of a composite attribute based on a rendering of a graph structure corresponding to the composite attribute, according to an embodiment.

The data preprocessing system 100 presents structural representations of values of composite attributes using various ways as illustrated in FIGS. 16, 17, and 18. Other embodiments can use other mechanisms to show structure of composite attributes.

FIG. 16 shows a screenshot of a user interface illustrating a structural representation of values of a composite attribute based on indentation of text, according to an embodiment. The user interface manager 310 configures for presentation via the client application 210, the user interface shown in FIG. 16. The user interface manager 310 receives input identifying a column 1610 storing a composite attribute along with a request to show the structural representation of a specific data value in a given cell of the column. In other embodiments, the user interface manager 310 receives a request identifying a column 1610 storing values of a composite attribute, the request for displaying all (or a subset of) cell values of the column using the structural representation of each cell value of the column displayed.

As shown in FIG. 16, the user interface manager 310 shows the structural representation 1620 of a cell value as a textual representation that indents attributes of the composite attribute. The user interface manager 310 determines the amount of indentation of an attribute based on the depth at which the attribute is nested in the composite attribute. For example, assume that a first composite attribute includes one or more simple attributes and a second composite attribute. The user interface manager 310 shows the attributes of the second composite attribute as being indented more than the simple attributes of the first composite attribute. This is so because the depth of the attributes of the second composite attribute (having a depth value two) is more than the depth of the simple attributes of the first composite attribute (having a depth value 1.) If the nested composite attribute includes a third composite attribute, the user interface manager 310 shows the attributes of the third composite attribute as being indented more than the attributes of the second composite attribute. This is so because the depth of the attributes of the third composite attribute (having a depth value 3) is greater than the depth of the attributes of the second composite attribute (having a depth value 2.)

FIG. 16 shows the user interface presenting a composite attribute with information describing a business. Assume that the column 1610 shows a composite attribute storing information describing businesses (called "business_info".) As shown in FIG. 16, "By Appointment Only" is a simple attribute 1630 of the "business_info" composite attribute. The simple attribute 1630 "By Appointment Only" can take true/false values. However, "Parking" is a nested attribute 1620 within the composite attribute "business_info". The attributes "garage", "street", "validated", "lot", and "valet" are simple attributes of the nested attribute 1620 "Parking". The attribute "garage" is nested at a depth greater than the depth of the attribute "By Appointment Only". Accordingly, the user interface manager 310 attribute shows the attribute "garage" as being indented more than the attribute "By Appointment Only".

The user interface manager 310 can use other ways to show structural information of values of attributes. FIG. 17 illustrates a structural representation of values of a composite attribute based on geometric shapes indicating nesting of attributes within the composite attribute, according to an embodiment. As shown in FIG. 17, the user interface manager 310 represents attributes using shapes, for example, rectangles, ellipse, circles or any other shape. The user interface manager 310 shows the geometric shapes of a nested attribute as a geometric shape within a geometric shape. For example, if a first composite attribute includes a second composite attribute, the geometric shape of the second composite attribute is shown within the geometric shape representing the first composite attribute.

As shown in FIG. 17, C is the outer most composite attribute represented by an ellipse 1710. The attribute C includes simple attributes C1, C2, and C4 each represented using an ellipse. The composite attribute C includes a composite attribute C3 nested within C. The nested attribute C3 is shown as an ellipse 1720 within the ellipse 1710. The composite attribute C3 includes a simple attribute C31 and two composite attributes C32 and C33. The ellipse 1730 represents the composite attribute C32 and the ellipse 1740 represents the composite attribute C33. The simple attributes C321, C32, and C323 that are within the composite attribute C32 are represented as ellipses within the ellipse 1730. Similarly, the simple attributes C331 and C332 that are within the composite attribute C33 are represented as ellipses within the ellipse 1740.

FIG. 18 illustrates a structural representation of values of a composite attribute based on a rendering of a graph structure corresponding to the composite attribute, according to an embodiment. The user interface manager 310 presents a graph or a tree as the structural representation of the composite attribute. Accordingly, the user interface manager 310 presents each simple or composite attribute as a node. The user interface manager 310 shows links 1800 (represented as arrows) pointing at attributes of a composite attribute. For example, as shown in FIG. 18, composite attribute D includes attributes D1, D2, D3, and D4. Accordingly, the user interface manager 310 shows links from the node representing composite attribute D to each of the attributes D1, D2, D3, and D4.

The simple attributes D1, D2, and D4 do not show any links pointing out of these attributes since a simple attribute is a single value and does not contain any attributes. However, D3 is a composite attribute within composite attribute D. Accordingly, the user interface manager 310 shows links from D3 to simple attribute D31 and composite attribute D32. Since D32 is also composite attribute, the user interface manager 310 shows links from D32 to simple attributes D321 and D322. Accordingly, the user interface manager 310 configures a tree structure (or a graph structure) showing the nested structure of a composite attribute. A user can select any node of the tree structure shown in FIG. 18 to identify a particular attribute.

For any of the structural representation discussed herein, the nested data structure processor 230 determines a path of an attribute within the composite attribute. As an example, if the user interface manager 310 receives a selection of the attribute D31 via the tree structure of FIG. 18, the nested data structure processor 230 determines the path of the selected attribute as D→D3[ ]→D31. The expression D3[ ] indicates that the attribute D3 is a composite attribute itself. As another example, if the user interface manager 310 receives a selection of the attribute D321 made using the tree structure of FIG. 18, the nested data structure processor 230 determines the path of the selected attribute as D→ D3[ ]→D32[ ]→D322. The nested data structure processor 230 determines the path by identifying all attributes that need to be traversed starting from the top most composite attribute to reach the selected attribute.

Figure 19:
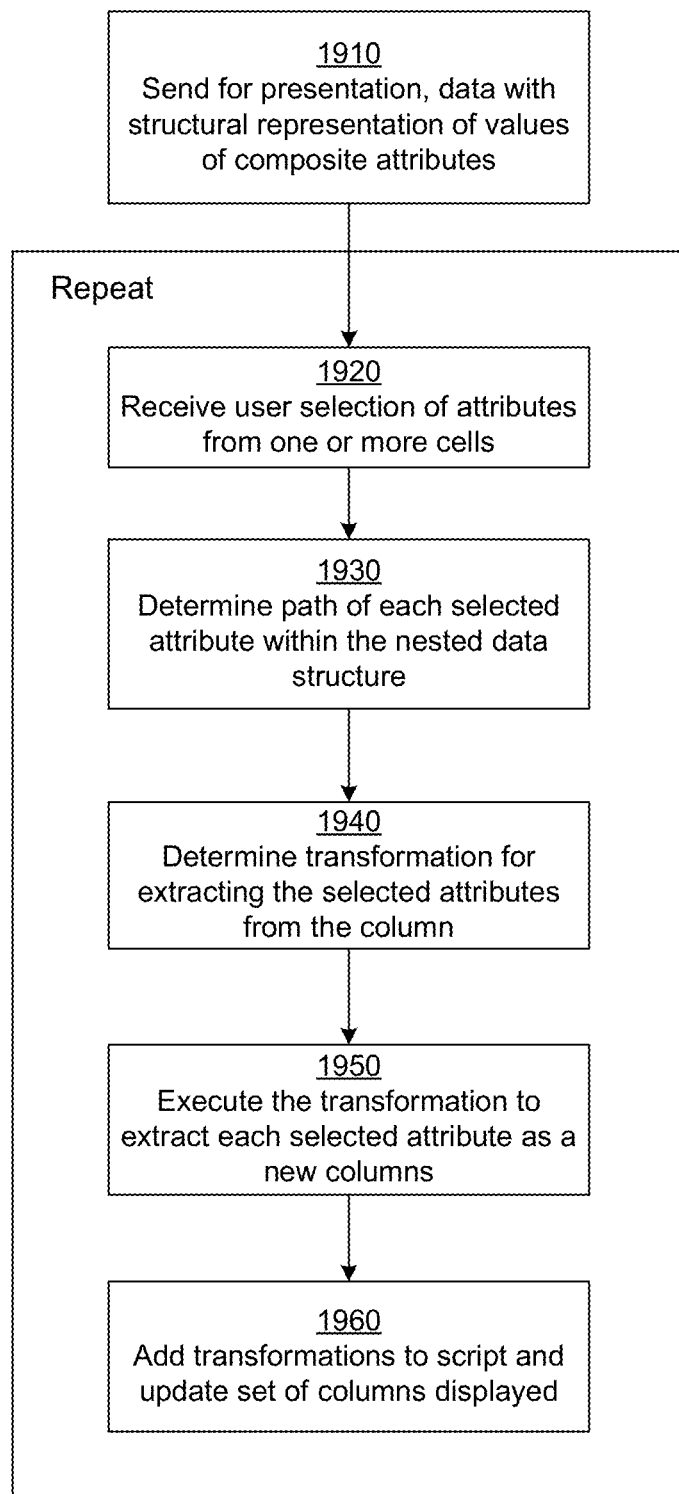
FIG. 19 shows the process of using structural representation of composite attributes to develop a transformation script for preprocessing datasets, according to an embodiment.

Overall Process for Building a Transformation Script Based on Structural Representation of a Composite Attribute FIG. 19 shows the process of using structural representation of composite attributes to develop a transformation script for preprocessing datasets, according to an embodiment. The user interface manager 310 sends 1910 for presentation a representation of the dataset via the client application 210. The dataset is assumed to include one or more composite attributes along with simple attributes. The user interface manager 310 configures one or more data values of a composite attribute using the structural representation of the data values, for example, the structural representations shown in FIG. 16, 17, 18, or 7.

In an embodiment, the user interface manager 310 shows the structural representation of one or more data values of a column storing composite attributes using the structural representation. These data values may comprise all the data values that can be displayed on a screen, for example, a screen of the client device 260. The structural representation of a first value shown may be different from the structural representation of a second value of the composite attribute shown. This is so because the two values may have different structures even though they are values of the same composite attribute, for example, due to certain attributes of the composite attribute being present in one value but not in another (and vice versa.)

In another embodiment, the user interface manager 310 initially presents data values of a composite attribute in text form. The user interface manager 310 receives selections of values of the composite attribute made by the user via the client application 210. The user interface manager 310 converts the selected values to structural representations and sends 1910 the converted representations to the client application 210 for display.

The user interface manager 310 further receives 1920 user selections of one or more attributes of the composite attribute from one or more values of the composite attribute based on the structural representation of the one or more values. For example, if the structural representation is based on indented text as shown in FIG. 16, the user may click on a textual representation of the name of an attribute to select the attribute. The user interface manager 310 may receive 1920 a plurality of user selections of attributes such that a first attribute is selected from a first cell value and a second attribute is selected from a cell second value of the composite attribute.

The nested data structure processor 230 determines the path of each selected attribute within the composite attribute. The path of an attribute identifies each nested attribute of the composite attribute that the system needs to traverse starting from the top level of the composite attribute to reach the selected attribute. In an embodiment, the nested data structure processor 230 determines an expression representing the path of each selected attribute. The expression may be based on syntax of a standard programming language or a proprietary syntax.

The nested data structure processor 230 provides the expressions representing the paths of the selected attributes to the transformation recommendation module 350. The transformation recommendation module 350 generates a transformation for extracting the selected attributes from the composite attribute for storing as a new column. The transformation execution engine 250 executes 1950 the generated transformations for a plurality of values of the composite attributes of the column to extract the selected attributes as new columns for the dataset.

The transformation recommendation module 350 adds 1960 the generated transformations to the transformation script being built. In an embodiment, the user interface manager 310 further receives selections of new columns that are generated. The user views the data of the generated column to decide whether the user wants to keep the new column in the transformed dataset or not. The transformation recommendation module 350 adds 1960 only the transformations for generating the selected new columns to the transformation script. The user interface manager 310 updates the dataset to include the new columns, for example, by modifying any metadata representing the transformed dataset.

FIG. 20 shows a screenshot of the user interface showing a structural representation of values of a column of a dataset storing a composite attribute, according to an embodiment. The user interface manager 310 receives a selection of a composite column of the dataset with a request to show the structural representation of the values of the column. In the embodiment, shown in FIG. 20, the user interface manager 310 shows the structural representation of the column 2070a that provides a textual description of the values such that the indentation of an attribute of the composite attribute is based on the depth of nesting of the attribute.

The user interface manager 310 may present a different structural representation for each value of the composite attribute since certain values may include some attributes contained within the composite attribute whereas other values may include different attributes within the composite attribute. For example, the value 2020 includes attributes that are absent in the value 2010. In particular, the composite attribute of the column 2070a includes a nested attribute with name "votes" that is empty in the value 2010 but includes several attributes in the value 2020. Accordingly, the user interface manager 310 may receive selections of different attributes from two different values of the composite attribute.

The user interface manager 310 receives selection of the attributes 2030 named "start_date" from value 2010 and selection of attribute 2050 named "bill_number" and attribute 2060 named "question" from the value 2020. As shown in FIG. 20, the depth of nesting of the attribute 2030 is different from the depth of nesting of attributes 2050 and 2060.

In an embodiment, if the user interface manager 310 receives a selection of an attribute within a composite attribute, the user interface manager 310 determines the path of the attribute within the composite attribute. The user interface manager 310 further determines whether there is a value of the attribute in other values of the composite attribute. If the other values of the composite attribute include a value of the attribute, the user interface manager 310 indicates these values as selected. The user interface manager 310 may indicate an attribute as being selected by changing the display corresponding to the attribute, for example, by distinguishing the attribute from other attributes by using a different font, color, size of text, of by showing the attribute as flashing.

In an embodiment, the user interface manager 310 allows a user to select multiple attributes of the composite attribute via different values of the composite attribute. The user interface manager 310 identifies whether any two selected attributes refer to the same attribute. If so, the user interface manager 310 eliminates the duplicate attributes to determine a set of distinct attributes of the composite attributes.

The nested data structure processor 230 determines paths of all the selected attributes within the composite attribute. The transformation recommendation module 350 generates commands to extract (or unnest) the selected attributes and presents them as new columns of the dataset. The transformation execution engine 250 executes the commands to generate new columns for the dataset. The user interface manager 310 sends for display the data of the new columns generated, for example, the column 2070b corresponding to attribute "start_date", column 2070c corresponding to attribute "bill_number", and column 2070d corresponding to attribute "question."

Transformations for Filtering Records

In an embodiment, if the data preprocessing system 100 receives a selection of a value of an attribute based on the user interface, the data preprocessing system 100 generates recommendations of transformations that filter records of the dataset having that value for that attribute. The user interface manager 310 may receive a selection of a value from the textual representation of the data or based on the structural representation of the data.

A composite attribute may comprise a list of name value pairs or a list of values (or array). Accordingly, the user interface manager 310 receives a value associated with a name value pair or a value from a list of values. The user interface manager 310 provides the selected value to the transformation recommendation module 350.

The transformation recommendation module 350 generates the recommendation of a transformation based on whether the user interface manager 310 received a selection of a name or a selection of a value. If the user interface manager 310 receives a selection of a name, the transformation recommendation module 350 generates a transformation for unnesting the attribute with that name to a new column. If the user interface manager 310 receives a selection of a value associated with a name, the transformation recommendation module 350 generates a transformation for filtering records in which the attribute corresponding to the name has the selected value. If the user interface manager 310 receives a selection of a value from an array or list of values corresponding to an attribute, the transformation recommendation module 350 generates a transformation that filters all records where that attribute includes at least one occurrence of that value.

If the user interface manager 310 receives selection of a plurality of values, the transformation recommendation module 350 generates a filter that logically combines expressions based on the various selected values. For example, if the user interface manager 310 receives selection of a first value for a first attribute (based on a first name-value pair) and a second value for a second attribute (based on a second name-value pair), the transformation recommendation module 350 generates a filter that logically combines two filters, a first filter that selects all records where the first attribute equals the first value and a second filter that selects all records where the second attribute equals the second value. In an embodiment, the logical combination is a logical-or operation.

In some embodiments, the transformation recommendation module 350 presents a plurality of transformations, each transformation based on a distinct logical expression that combines the plurality of filters based on the user selection of the plurality of values. The transformation recommendation module 350 ranks the transformations recommended based on heuristics. For example, the transformation recommendation module 350 may determine the priority of the transformations combining two filters based on the depths of the attributes being combined.

For example, if the transformation recommendation module 350 is combining a first filter based on a first attribute and a second filter based on a second attribute and the first and second attribute belong to the same composite attribute (and therefore having the same depth), the transformation recommendation module 350 ranks a logical-or operation higher than a logical-and operation. However, assume that the transformation recommendation module 350 is combining a first filter based on a first attribute and a second filter based on a second attribute. Furthermore, the first attribute belongs to a first composite attribute and the second attribute belongs to a second composite attribute, wherein the second composite attribute is nested within the first composite attribute. Accordingly, the two attributes have different depths of nesting within a composite attribute. In this situation, the transformation recommendation module 350 ranks a logical-and operation higher than a logical-or operation.

Unnesting Collection Attributes

The data preprocessing system 100 recommends certain transformations of a dataset that add new columns to the dataset but leave the number of records of the dataset unchanged. However, the data preprocessing system 100 may recommend transformations of the dataset that increase the number of records of the dataset. Assume that a dataset includes a composite attribute X representing a nested data structure. Also assume that the data preprocessing system 100 receives a request to unnest a selected attribute (called attrA) of the composite attribute. The selected attribute may be a top level attribute or a deeply nested attribute. If the selected attribute is nested within the composite attribute, the data preprocessing system determines the path of the selected attribute within the composite attribute.

The path of the selected attribute identifies all composite attributes (i.e., objects representing the composite attributes) that need to be traversed from the top level of the composite attribute X to reach the selected attribute. For example, assume that the composite attribute X includes another composite attribute Y, the composite attribute Y includes a composite attribute Z, and the selected attribute attrA is an attribute within the composite attribute Z. The path of the attribute attrA may be represented as X→Y→Z→attrA. In this expression the arrow → indicates a relation between a container object (or composite attribute) and a contained attribute. For example A→B represents the path of an object or attribute B contained in the object A. The data preprocessing system 100 determines whether any object in the path identifying the selected attribute attrA within the composite attribute X is a collection, i.e., it has a cardinality greater than one. In other words the collection attribute is configured to store a plurality of values.

If a particular object in the path of the selected attribute attrA within the composite attribute X is a collection, the data preprocessing system 100 generates a transformation that increases the number of records of the transformed dataset. In particular, the transformation creates N records corresponding to each input record of the dataset, where N is the number of elements of the collection attribute in the input record. Each input record may result in generation of a different number of records in the transformed dataset depending on the cardinality of the value of the collection attribute for that record.

Assume that there is a plurality of attributes in the path of the attrA that represent collections. Furthermore, one or more attributes belonging to objects occurring in the path of attrA are selected for being unnested. The generated transformation generates a plurality of output records for each input record. The number of records in the plurality of output records is the product of number of objects in each distinct collection identified in the path of the attrA. For example, assume that there are two collections C1 and C2 in the path of attrA. Assume that for a given input record, the collection attribute C1 has N1 elements and the collection attribute C2 has N2 elements. The transformation recommendation module 350 generates a transformation that outputs N1×N2 (i.e., product of N1 and N2) records in the result dataset corresponding to the input record.

Assume that along with the attrA, the data preprocessing system 100 receives selections of other attributes that are not on a path including a collection, for example, attrB. The data preprocessing system 100 generates a transformation that determines the value of attrB for an input record and repeats the value of attrB for every output record generated from the input record (corresponding to each element of the collection or collections corresponding to attrA.)

The unnesting of the attributes belonging to collections may be performed using the structural representation of the composite attributes or by using the textual or visual representation of the attributes. The structural representation allows selection of a deeply nested attribute in one user interaction whereas the visual representation (i.e., histogram) requires multiple user interactions for unnesting the attributes level by level.

Figure 21:
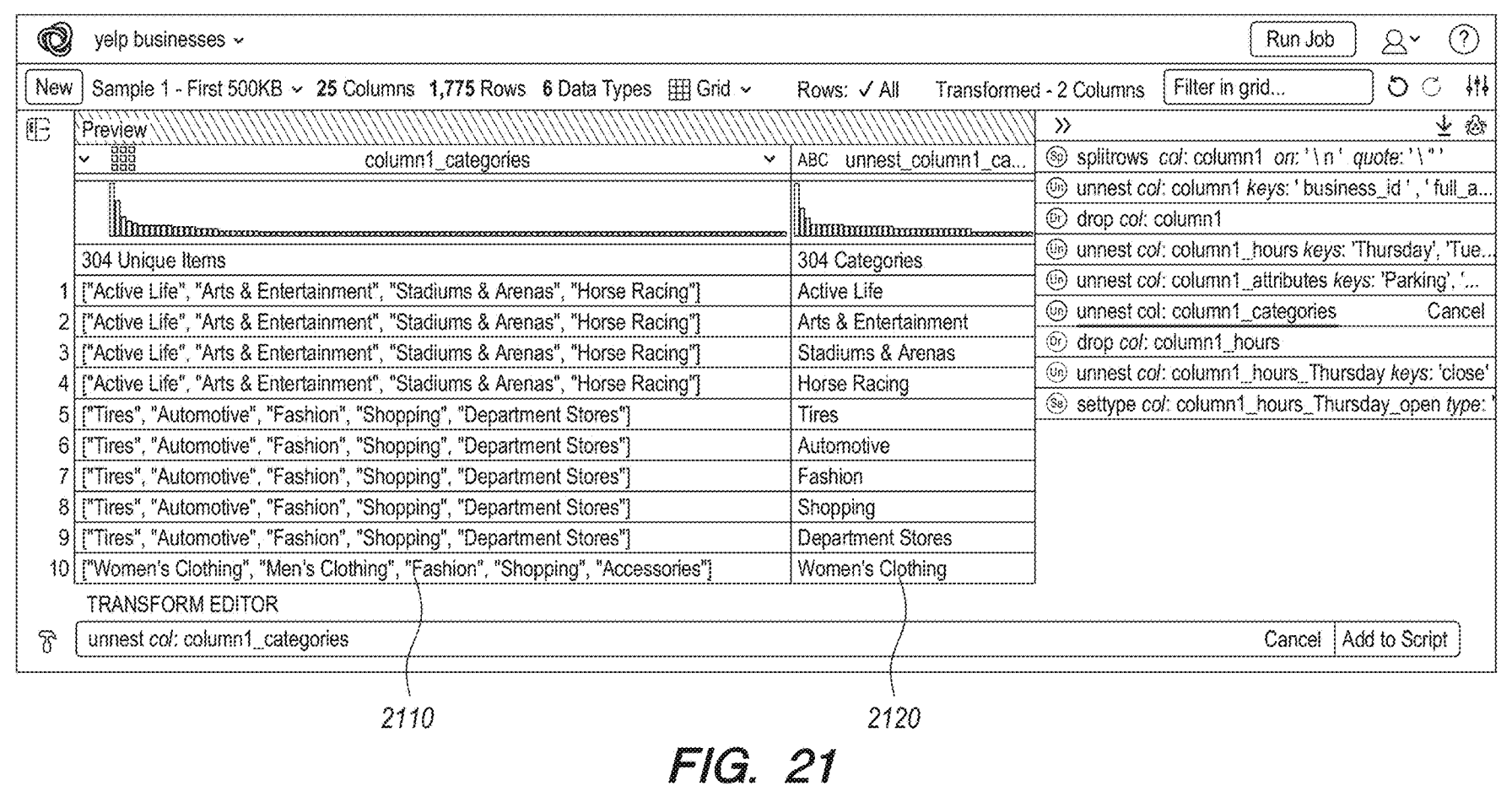

FIG. 21 shows a screenshot of the user interface showing unnesting of a composite attribute representing an array or a set of values, according to an embodiment. Assume that the dataset includes an attribute that represents a collection of values, for example, an array of values, a list of values or an ordered set of values. Each value of the collection can be a nested data structure, a collection of values, or a simple value. An example of an array value as shown in FIG. 21 is categories associated with a business listed as ["Active Life", "Arts & Entertainment", "Stadiums & Arenas", "Horse Racing"].

The user interface manager 310 receives a selection of an attribute storing array values. The user interface manager 310 may receive the selection of the attribute via a textual representation, a visual representation, or a structural representation. Alternatively, if the attribute is represented as a column 2110 of the dataset, the user interface manager 310 may receive the selection of the column.

The transformation recommendation module 350 recommends transformations including a transformation that unnests the selected attribute into a new column. The transformation creates a separate record for each value from an array corresponding to the selected attribute. Accordingly, data preprocessing system 100 copies each record that has a non-empty value of the attribute into the dataset a number of times. The number of copies of the record depends on the number of values in the array corresponding to the attribute.

For example, assume there are two records of the dataset that have non-empty arrays corresponding to the attribute, the first array having 5 values and the second array having 6 values. The generated transformation for the unnest of the array attribute duplicates the record corresponding to the first value into 5 records and the record corresponding to the second array value into 6 records. A new column 2120 is added to the dataset storing values from the arrays of column 2110. Each new copy of the record stores a value from the array in the new column 2120.

FIG. 21 shows extraction of values of an array into a new column of the dataset. However, the mechanisms disclosed herein apply for extracting an attribute nested within a composite attribute such that at least one attribute along the path of the selected attribute is a collection.

FIG. 22 shows a screenshot of the user interface showing unnesting of another composite attribute, according to an embodiment. The column 2200a stores a composite attribute having a multiple depth of nesting that includes name-value pairs as well as arrays within the composite attribute. For example, the composite attribute includes an attribute 2210 representing a "start_date" as a name-value pair. The composite attribute includes "votes" as an array of other composite attribute values. An element of the votes array includes attributes 2220 such as "bill_number" and "question" represented as name-value pairs. Each element of the votes attributes includes other composite attributes "democratic", "republican", "independent", and so on.

As shown in FIG. 22, the user interface manager 310 receives user selections of attributes at various depths of nesting. The transformation recommendation module 350 generates transforms to extract the attributes. If the selected attribute was only "start_date" attribute, the generated transform extracts values of the "start_date" attribute from each record of the input dataset to a new column. However, the number of records in the dataset is unchanged as a result of this transformation.

However, if an attribute of the "votes" array is selected, the number of records of the transformed dataset is increased. Each input record of the input dataset results in as many records in the transformed dataset as there are elements in the votes array of the input record. In other words, since "votes" is an array attribute, each record of the input dataset is copied as many times as the number of elements within the votes array.

The attribute "majority_position" is at a depth greater than the depth of the votes attribute. However, each element of the votes attribute includes a single instance of the "democratic" composite attribute or "republican" composite attribute. As a result, the generated transformation does not result in additional records in the transformed dataset as a result of addition of the "majority_position" attribute in the set of selected attributes.

Parameterizing Transformation Scripts

The process of building transformation scripts as described above applies to specific columns of an input dataset. For example, a user may unnest a first column storing nested data structure and then repeat the process for unnesting a second column storing another nested data structure. According to some embodiments, the data preprocessing system 100 receives a request from the user to reuse the transformation script or a portion of the transformation script for unnesting a different column from the column use to build the transformation script. The transformation script or a portion of the transformation script can be reused if the nested structure of two composite attribute matches.

In an embodiment, the data preprocessing system 100 receives a mapping from attribute names of a first composite attribute to attribute names of a second composite attribute. The data preprocessing system 100 builds a first transformation script based on interactions related to the first composite attribute. The data preprocessing system 100 generates a second transformation script for the second composite attribute by modifying the first transformation script based on the mapping. More specifically, the data preprocessing system 100 replaces attribute names in the first transformation script to correspond to attribute names of the second composite attribute. Accordingly, the data preprocessing system 100 generates the transformation script for unnesting the second composite attribute without requiring user interactions as described in FIG. 6 or FIG. 19. Instead the user simply provides a mapping from attribute names of the first composite attribute to attribute names of the second composite attribute. The mapping associates attributes of the composite attribute that structurally occur in matching positions (or paths) within the composite attribute.

In an embodiment, the data preprocessing system 100 converts a transformation script or a portion of a transformation script into a reusable module. The data preprocessing system 100 identifies parameters for the transformation script such that each parameter represents an attribute in the transformation script. A user can identify a parameterized transformation script and use that to unnest a new composite attribute if the nested structure of the composite attribute matches the composite attribute used to build the transformation script.

In an embodiment, the data preprocessing system 100 maintains a library of reusable modules of parameterized transformation scripts. The data preprocessing system 100 allows a user to build a transformation script for unnesting a composite attribute or to reuse a preexisting parameterized transformation script.

Alternative Embodiments

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for preprocessing data for analysis, the method comprising:
    receiving, at a data preprocessing system, a dataset comprising a plurality of records, each record comprising values of a plurality of attributes, the dataset including one or more composite attributes, each composite attribute comprising a plurality of attributes;
    configuring for display, attributes of the dataset as columns, the display of an attribute presenting a visual representation comprising shapes representing statistical information describing the attribute indicating a distribution of values of the attribute within the plurality of records, and wherein the visual representation of a composite attribute comprises shapes representing statistical information indicating a distribution of top level attributes of the composite attribute within the plurality of records; and
    building a transformation script comprising a sequence of transformations, the building comprising, iteratively:
        receiving a selection of a composite attribute of the dataset;
        receiving a selection of one or more attributes of the selected composite attribute, the selection identifying one or more shapes from the visual representation of the selected composite attribute;
        for each selected attribute of the composite attribute, determining a recommended transformation for extracting values of the selected attribute from values of the selected composite attribute;
        adding at least a subset of the determined recommended transformations to the sequence of transformations of the transformation script;
    preprocessing the dataset using the transformation script; and
    sending the preprocessed dataset to a data analysis system, for analysis by the data analysis system.

2. The method of claim 1, wherein the composite attribute is a first composite attribute and at least one selected attribute of the composite attribute is a second composite attribute, and wherein responsive to extracting the selected attribute from the first composite attribute:

receiving a selection of one or more attributes of the second composite attribute;

for each of the selected attributes of the second composite attribute, configuring for display one or more new columns, each new column associated with a recommended transformation for extracting the attribute from the composite attribute; and including one or more recommended transformations for extracting attributes from the second composite attribute in the transformation script.

3. The method of claim 1, wherein building the transformation script further comprises:

displaying new columns storing results of the recommended transformations based upon values of the selected attributes corresponding to the recommendation transformations;

receiving selections of one or more of the new columns; and wherein the one or more recommended transformations added to the transformation script correspond to the selected new columns.

4. The method of claim 1, wherein the display of a column corresponding to an attribute further comprises display of values of the attribute in text form.

5. The method of claim 4, wherein the selection of an attribute of the composite attribute is received via one of the visual representation or the textual representation, and wherein:

responsive to the selection of the attribute via the visual representation, a first set of recommended transformations is determined for extracting the attribute from the composite attribute, and responsive to the selection of the attribute via the textual representation, a second set of transformations is determined for extracting the attribute from the composite attribute.

6. The method of claim 1, wherein a value of the composite attribute is represented as a plurality of name-value pairs.

7. The method of claim 6, wherein responsive to receiving a selection of a name of an attribute of the composite attribute, generating a transformation for extracting all values corresponding to the name and displaying the values as a new column, wherein each value of the new column includes a value if the corresponding value of the composite attribute includes a name-value pair having the name.

8. The method of claim 6, wherein responsive to receiving a selection of a value from a name-value pair of the composite attribute, generating a transformation for filtering records including the composite attribute.

9. The method of claim 1, wherein the visual representation of the composite attribute displays frequency of occurrence of attributes of the composite attribute within the column of the dataset storing the composite attribute.

10. The method of claim 1, wherein receiving the selection of one or more attributes of a composite attribute comprising receiving a selection of information identifying the attribute in the textual representation of the values of the composite attribute.

11. The method of claim 1, wherein visualization of a simple attribute displays an indication of frequency of each distinct value of the simple attribute in the column corresponding to the simple attribute.

12. The method of claim 1, wherein the transformation script comprises instructions for extracting attributes of a first composite attribute, the method further comprising:

receiving mapping one or more attributes of the first composite attribute to attributes of a second composite attribute, and determining instructions for extracting attributes of the second composite attribute by modifying the instructions for extracting attributes of the first composite attribute based on the mapping.

13. A method for preprocessing data for analysis, the method comprising:

receiving, at a data preprocessing system, a dataset comprising a plurality of records, each record comprising values of a plurality of attributes, the dataset including one or more composite attributes, each composite attribute comprising a plurality of attributes;

configuring for display, attributes of the dataset as columns, the display of an attribute presenting a visual representation comprising shapes representing statistical information describing the attribute indicating a distribution of values of the attribute within the plurality of records, and wherein the visual representation of a composite attribute comprises shapes representing statistical information indicating a distribution of top level attributes of the composite attribute within the plurality of records; and building a transformation script comprising a sequence of transformations, the building comprising, iteratively:

receiving a selection of a composite attribute of the dataset;

receiving a selection of one or more attributes of the selected composite attribute, the selection identifying one or more shapes from the visual representation of the selected composite attribute;

determining a recommended transformation corresponding to each selected attribute of the composite attribute, the recommended transformation extracting values of the selected attribute from values of the selected composite attribute;

adding at least a subset of the determined recommended transformations to the sequence of transformations of the transformation script.

14. The method of claim 1, wherein the display of a column corresponding to an attribute further comprises display of values of the attribute in text form and wherein the selection of an attribute of the composite attribute is received via one of the visual representation or the textual representation, and wherein:

responsive to the selection of the attribute via the visual representation, a first set of recommended transformations is determined for extracting the attribute from the composite attribute, and responsive to the selection of the attribute via the textual representation, a second set of transformations is determined for extracting the attribute from the composite attribute.

15. The method of claim 13, wherein a value of the composite attribute is represented as a plurality of name-value pairs and wherein responsive to receiving a selection of a value from a name-value pair of the composite attribute, generating a transformation for filtering records including the composite attribute.

16. The method of claim 13, wherein the display of a column corresponding to an attribute further comprises display of values of the attribute in text form, wherein the selection of an attribute of the composite attribute is received via one of the visual representation or the textual representation, and wherein:

responsive to the selection of the attribute via the visual representation, a first set of recommended transformations is determined for extracting the attribute from the composite attribute, and responsive to the selection of the attribute via the textual representation, a second set of transformations is determined for extracting the attribute from the composite attribute.

17. A computer readable non-transitory storage medium storing instructions for:

receiving, at a data preprocessing system, a dataset comprising a plurality of records, each record comprising values of a plurality of attributes, the dataset including a composite attribute comprising a plurality of attributes;

configuring for display, attributes of the dataset as columns, the display of an attribute presenting a visual representation comprising shapes representing statistical information describing the attribute indicating a distribution of values of the attribute within the plurality of records, and wherein the visual representation of the composite attribute comprises shapes representing statistical information indicating a distribution of attributes of the composite attribute within the plurality of records; and building a transformation script comprising a sequence of transformations, the building comprising, iteratively:

receiving a selection of one or more attributes of the composite attribute, the selection identifying one or more shapes from the visual representation of the composite attribute;

determining a recommended transformation corresponding to each selected attribute of the composite attribute, the recommended transformation extracting values of the selected attribute from values of the composite attribute;

adding at least a subset of the determined recommended transformations to the sequence of transformations of the transformation script;

preprocessing the dataset using the transformation script; and sending the preprocessed dataset to a data analysis system, for analysis by the data analysis system.

18. The computer readable non-transitory storage medium of claim 17, wherein the display of a column corresponding to an attribute further comprises display of values of the attribute in text form and wherein the selection of an attribute of the composite attribute is received via one of the visual representation or the textual representation, and wherein:

responsive to the selection of the attribute via the visual representation, a first set of recommended transformations is determined for extracting the attribute from the composite attribute, and responsive to the selection of the attribute via the textual representation, a second set of transformations is determined for extracting the attribute from the composite attribute.

19. The computer readable non-transitory storage medium of claim 17, wherein a value of the composite attribute is represented as a plurality of name-value pairs and wherein responsive to receiving a selection of a value from a name-value pair of the composite attribute, generating a transformation for filtering records including the composite attribute.

20. A computer system, comprising:

a computer processor; and a computer readable non-transitory storage medium storing instructions that cause the computer processor to perform steps for:

receiving a dataset comprising a plurality of records, each record comprising values of a plurality of attributes, the dataset including one or more composite attributes, each composite attribute comprising a plurality of attributes;

configuring for display, attributes of the dataset as columns, the display of an attribute presenting a visual representation comprising shapes representing statistical information describing the attribute indicating a distribution of values of the attribute within the plurality of records, and wherein the visual representation of a composite attribute comprises shapes representing statistical information indicating a distribution of top level attributes of the composite attribute within the plurality of records; and building a transformation script comprising a sequence of transformations, the building comprising, iteratively:

receiving a selection of a composite attribute of the dataset;

receiving a selection of one or more attributes of the selected composite attribute, the selection identifying one or more shapes from the visual representation of the selected composite attribute;

determining a recommended transformation corresponding to each selected attribute of the composite attribute, the recommended transformation extracting values of the selected attribute from values of the selected composite attribute;

adding at least a subset of the determined recommended transformations to the sequence of transformations of the transformation script;

preprocessing the dataset using the transformation script; and sending the preprocessed dataset to a data analysis system, for analysis by the data analysis system.

* * * * *